(12) United States Patent
Chapman et al.

(10) Patent No.: US 8,014,936 B2
(45) Date of Patent: Sep. 6, 2011

(54) FILTERING ROAD TRAFFIC CONDITION DATA OBTAINED FROM MOBILE DATA SOURCES

(75) Inventors: Craig H. Chapman, Redmond, WA (US); Oliver B. Downs, Redmond, WA (US); Alec Barker, Woodinville, WA (US); Mitchel A. Burns, Jr., Woodinville, WA (US); Scott R. Love, Seattle, WA (US)

(73) Assignee: Inrix, Inc., Kirkland, WA (US)

( * ) Notice: Subject to any disclaimer, the term of this patent is extended or adjusted under 35 U.S.C. 154(b) by 1371 days.

(21) Appl. No.: 11/444,998

(22) Filed: May 31, 2006

(65) Prior Publication Data

US 2007/0208495 A1 Sep. 6, 2007

Related U.S. Application Data

(60) Provisional application No. 60/778,946, filed on Mar. 3, 2006, provisional application No. 60/789,741, filed on Apr. 5, 2006.

(51) Int. Cl.
| G08G 1/00 | (2006.01) |
| G08G 1/01 | (2006.01) |
| G08G 1/017 | (2006.01) |
| G08G 1/052 | (2006.01) |
| G08G 1/123 | (2006.01) |
| G08G 1/127 | (2006.01) |

(52) U.S. Cl. ......... 701/117; 701/119; 701/209; 701/213
(58) Field of Classification Search .................. 340/933, 340/995.13; 701/117, 209, 119, 213
See application file for complete search history.

(56) References Cited

U.S. PATENT DOCUMENTS 3,582,620 A 6/1971 Noetinger ................ 235/150.24
(Continued)

FOREIGN PATENT DOCUMENTS

CA 2 290 301 9/2000
(Continued)

OTHER PUBLICATIONS

Bluestein, Greg, "Traffic Jam? 2 Atlanta Companies Say Look to Your Cell Phone," The Mercury News, Nov. 5, 2006, downloaded Nov. 6, 2006, from http://www.mercurynews.com/mld/mercurynews/news/breaking_news/15937597.htm, 3 pages.

(Continued)

*Primary Examiner* — Khoi Tran
*Assistant Examiner* — Dale Moyer
(74) *Attorney, Agent, or Firm* — Seed IP Law Group PLLC

(57) ABSTRACT

Techniques are described for assessing road traffic conditions in various ways based on obtained traffic-related data, such as data samples from vehicles and other mobile data sources traveling on the roads, as well as in some situations data from one or more other sources (such as physical sensors near to or embedded in the roads). The assessment of road traffic conditions based on obtained data samples may include various filtering and/or conditioning of the data samples, and various inferences and probabilistic determinations of traffic-related characteristics from the data samples. In some situations, the filtering of the data samples includes identifying data samples that are inaccurate or otherwise unrepresentative of actual traffic condition characteristics, such as data samples that are not of interest based at least in part on roads with which the data samples are associated and/or that otherwise reflect vehicle locations or activities that are not of interest.

30 Claims, 13 Drawing Sheets

U.S. PATENT DOCUMENTS

| | | | |
|---|---|---|---|
| 3,626,413 A | 12/1971 | Zachmann | 343/8 |
| 4,866,438 A | 9/1989 | Knisch | 340/936 |
| 4,985,705 A | 1/1991 | Stammler | 342/69 |
| 5,173,691 A * | 12/1992 | Sumner | 340/905 |
| 5,182,555 A * | 1/1993 | Sumner | 340/905 |
| 5,289,183 A | 2/1994 | Hassett et al. | 340/905 |
| 5,337,082 A | 8/1994 | Fredericks | 342/69 |
| 5,416,711 A * | 5/1995 | Gran et al. | 701/117 |
| 5,465,289 A | 11/1995 | Kennedy, Jr. | 379/59 |
| 5,590,217 A | 12/1996 | Toyama | 382/104 |
| 5,610,821 A | 3/1997 | Gazis et al. | 364/444.2 |
| 5,652,705 A * | 7/1997 | Spiess | 701/117 |
| 5,663,720 A | 9/1997 | Weissman | 340/934 |
| 5,696,502 A | 12/1997 | Busch et al. | 340/905 |
| 5,745,865 A | 4/1998 | Rostoker et al. | 701/117 |
| 5,774,569 A * | 6/1998 | Waldenmaier | 382/100 |
| 5,827,712 A | 10/1998 | Yokoyama et al. | 435/193 |
| 5,884,212 A * | 3/1999 | Lion | 701/117 |
| 6,011,515 A | 1/2000 | Radcliffe et al. | 342/453 |
| 6,092,020 A * | 7/2000 | Fastenrath et al. | 701/119 |
| 6,119,013 A | 9/2000 | Maloney et al. | 455/456 |
| 6,150,961 A | 11/2000 | Alewine et al. | 340/995 |
| 6,177,886 B1 | 1/2001 | Billington et al. | |
| 6,204,778 B1 * | 3/2001 | Bergan et al. | 340/936 |
| 6,266,608 B1 | 7/2001 | Pertz | |
| 6,292,742 B1 | 9/2001 | Heimann et al. | 707/117 |
| 6,453,230 B1 | 9/2002 | Geurts | |
| 6,459,365 B2 | 10/2002 | Tamura | |
| 6,463,382 B1 | 10/2002 | Bullock | 701/117 |
| 6,466,862 B1 * | 10/2002 | DeKock et al. | 701/117 |
| 6,480,783 B1 | 11/2002 | Myr | 701/117 |
| 6,490,519 B1 | 12/2002 | Lapidot et al. | 701/117 |
| 6,496,773 B1 | 12/2002 | Olsson | 701/117 |
| 6,505,114 B2 | 1/2003 | Luciani | 701/117 |
| 6,574,548 B2 | 6/2003 | DeKock et al. | 701/117 |
| 6,594,576 B2 | 7/2003 | Fan et al. | 701/117 |
| 6,650,948 B1 | 11/2003 | Atkinson et al. | 700/66 |
| 6,664,922 B1 | 12/2003 | Fan | 342/357.1 |
| 6,728,628 B2 | 4/2004 | Peterson | |
| 6,781,523 B2 | 8/2004 | Matsui et al. | 340/910 |
| 6,810,321 B1 * | 10/2004 | Cook | 701/117 |
| 6,832,140 B2 | 12/2004 | Fan et al. | 701/33 |
| 6,842,620 B2 | 1/2005 | Smith et al. | |
| 6,862,524 B1 | 3/2005 | Nagda et al. | 701/209 |
| 6,882,313 B1 | 4/2005 | Fan et al. | 342/457 |
| 6,922,566 B2 | 7/2005 | Puranik et al. | 455/456.2 |
| 6,973,319 B2 | 12/2005 | Ormson | 455/456.1 |
| 6,990,407 B1 | 1/2006 | Mbekeani et al. | |
| 7,026,958 B2 | 4/2006 | Wainfan et al. | 340/995.13 |
| 7,027,915 B2 | 4/2006 | Craine | 701/117 |
| 7,069,143 B2 | 6/2006 | Peterson | |
| 7,096,115 B1 | 8/2006 | Groth et al. | 701/117 |
| 7,102,496 B1 | 9/2006 | Ernst, Jr. et al. | |
| 7,116,326 B2 | 10/2006 | Soulchin et al. | |
| 7,197,500 B1 * | 3/2007 | Israni et al. | 707/809 |
| 7,433,889 B1 * | 10/2008 | Barton | 1/1 |
| 7,706,965 B2 | 4/2010 | Downs et al. | |
| 2001/0029425 A1 | 10/2001 | Myr | |
| 2002/0026278 A1 * | 2/2002 | Feldman et al. | 701/117 |
| 2003/0065805 A1 | 4/2003 | Barnes, Jr. | |
| 2003/0201907 A1 * | 10/2003 | Thompson et al. | 340/917 |
| 2003/0225516 A1 | 12/2003 | DeKock et al. | |
| 2004/0030670 A1 * | 2/2004 | Barton | 707/1 |
| 2004/0034467 A1 | 2/2004 | Sampedro et al. | 701/201 |
| 2004/0039516 A1 | 2/2004 | Willembrock | |
| 2004/0220728 A1 | 11/2004 | Cayford | |
| 2005/0080555 A1 | 4/2005 | Parupudi et al. | |
| 2005/0131626 A1 | 6/2005 | Ignatin | |
| 2005/0131643 A1 | 6/2005 | Shaffer et al. | |
| 2005/0222751 A1 * | 10/2005 | Uyeki | 701/117 |
| 2005/0222763 A1 * | 10/2005 | Uyeki | 701/210 |
| 2005/0288856 A1 * | 12/2005 | Uyeki et al. | 701/210 |
| 2006/0055565 A1 | 3/2006 | Kawamata et al. | |
| 2006/0103674 A1 | 5/2006 | Horvitz et al. | 345/629 |
| 2006/0106530 A1 | 5/2006 | Horvitz et al. | 701/117 |
| 2006/0106599 A1 | 5/2006 | Horvitz | 704/219 |
| 2006/0106743 A1 | 5/2006 | Horvitz | 706/21 |
| 2006/0149461 A1 | 7/2006 | Rowley et al. | 701/202 |
| 2006/0155464 A1 | 7/2006 | Smartt | 701/208 |
| 2006/0229802 A1 | 10/2006 | Vertelney et al. | 701/200 |
| 2007/0208494 A1 | 9/2007 | Chapman et al. | |
| 2007/0219715 A1 * | 9/2007 | Uyeki et al. | 701/209 |
| 2008/0303693 A1 * | 12/2008 | Link, II | 340/905 |

FOREIGN PATENT DOCUMENTS

| | | |
|---|---|---|
| DE | 19928082 A1 | 12/2000 |
| JP | 10-160494 A | 6/1998 |
| WO | 9854682 A1 | 12/1998 |
| WO | 2004/021305 | 3/2004 |
| WO | 2004/021306 | 3/2004 |
| WO | 2006/005906 | 1/2006 |

OTHER PUBLICATIONS

"IntelliOne Launches Need4Speed, Two-Week Road Test of Groundbreaking Live Traffic Measurement and Reporting Technology," www.IntelliOne.com, Aug. 1, 2006, 2 pages.

"Dash Express Automotive Navigation System," retrieved Aug. 3, 2007, from http://www.dash.net/product.php, 1 page.

"Dash Navigation Unveils First Internet-Connected Auto Navigation Device," Sep. 26, 2006, Dash Navigation™, Inc., retrieved Aug. 3, 2007, from http://www.dash.net/news_pr-060925.php, 1 page.

"Inrix Advances Navigation with 'Nationwide Average Speeds'," Aug. 7, 2006, Inrix, Inc., retrieved Jul. 19, 2007, from http://www.inrix.com/news_ Nationwide AverageSpeeds_ 07Aug2006.asp, 1 page.

"INRIX Historical Traffic Improves Consumer Navigation Experience," Jul. 18, 2007, Inrix, Inc., retrieved Jul. 19, 2007, from http://www.inrix.com/news_NAS_18July2007.asp, 2 pages.

"LandSonar, Inc. Announces First-Ever Nationwide Traffic-Prediction Product," Jan. 22, 2006, LandSonar, Inc., retrieved Jul. 20, 2007, from http://www.landsonar.com/?p=55, 3 pages.

"NAVTEQ Launches NAVTEQ Traffic Patterns™ Database: *Historic Traffic Data is the Basis for Predicting Traffic Behavior and Enhancing Routes*," Jan. 5, 2007, NAVTEQ, retrieved Jul. 19, 2007, from http://www.navteq.com/webapps/NewsUserServlet?action=NewsDetail&newsId=479, 2 pages.

"TrafficCast International and Land Sonar Introduce LPS Plus," Mar. 1, 2007, LandSonar, Inc., retrieved Jul. 19, 2007, from http://www.landsonar.com/?p=117, 2 pages.

"About LandSonar, Inc.," retrieved Apr. 27, 2006, from http://www.landsonar.com/?page_id=2, 2 pages.

"Award Abstract—#0349460—SBIR Phase II: Animated Real-Time Road Traffic Visualization for Broadcast and the Internet," National Science Foundation, retrieved Jul. 31, 2006, from http://www.nsf.gov/awardsearch/showAward.do?AwardNumber=0349460, 2 pages.

"Global Positioning Systems > Tracking Systems in the Yahoo! Directory," Yahoo!® Small Business Directory, retrieved Feb. 8, 2006, from http://dir.yahoo.com/Business_and_Economy/Business_to_Business/Navigation/Global_ Positioning_Systems/ Tracking_Systems, 8 pages.

"Powerful Tool Crunches Commutes," Mar. 8, 2005, National Science Foundation, retrieved Jan. 20, 2006, from http://www.beatthetraffic.com/aboutus/nsf20050308.htm, 2 pages.

"Seattle Area Traffic—Central Puget Sound Travel Times," Washington State Department of Transportation, retrieved Jan. 20, 2006, from http://www.wsdot.wa.gov/traffic/seattle/traveltimes/, 3 pages.

"Technology Overview," retrieved Apr. 27, 2006, from http://www.landsonar.com/?page_id=20, 3 pages.

BeatTheTraffic.com: The Right Traffic at the Right Time™, Homepage, retrieved Jan. 20, 2006, from http://www.beatthetraffic.com/, 1 page.

Graham-Rowe, D., "Smart Traffic Forecast Offers Seven-Day Predictions," Jun. 29, 2005, NewScientist.com, retrieved Jan. 20, 2006, from http://www.newscientist.com/ article.ns?id=dn7605& print=true, 2 pages.

Green, D., "Navigating by Phone," Apr. 28, 2004, Palo Alto Weekly Online Edition, retrieved Jul. 27, 2006, from http://www.paloaltoonline.com/weekly/morgue/2004/2004_04_28. zipdash28ja.shtml, 3 pages.

Slawski, W., "Ending Gridlock with Google Driving Assistance (Zipdash Re-Emerges)," Jul. 6, 2006, retrieved Jul. 27, 2006, from http://www.seobythesea.com/?p=240, 3 pages.

Smith, B. "OmniTRACS Keeps on Trucking," Dec. 1, 2005, WirelessWeek.com, retrieved Feb. 7, 2006, from http://www.wirelessweek.com/index.asp?layout=articlePrint&articleID=CA6287997, 2 pages.

Utter, D., "Google Mobilizes Traffic Data," Jul. 25, 2006, webpronews.com, retrieved Jul. 27, 2006, from http://www.webpronews.com/topnews/topnews/wpn-60-20060725GoogleMobilizesTrafficData.html, 3 pages.

Hobeika, A.G., et al, "Traffic-Flow-Prediction Systems Based on Upstream Traffic," 1994, Vehicle Navigation and Information Systems Conference Proceedings, pp. 345-350.

* cited by examiner

Data Sample Outlier Elimination

| Excluded Sample | Speed |
|---|---|
| 1 | 26 |
| 2 | 31 |
| 3 | 0 |
| 4 | 37 |
| 5 | 33 |
| 6 | 21 |
| 7 | 30 |
| 8 | 45 |
| 9 | 3 |
| 10 | 31 |

| Data Sample Group | Data Sample Group Average Speed | Average Speed Deviation | Leave Out? |
|---|---|---|---|
| 2-10 | 25.7 | 0.02 | no |
| 1, 3-10 | 25.1 | 0.39 | no |
| 1-2, 4-10 | 28.6 | 2.44 | yes |
| 1-3, 5-10 | 24.4 | 0.88 | no |
| 1-4, 6-10 | 24.9 | 0.55 | no |
| 1-5, 7-10 | 26.2 | 0.35 | no |
| 1-6, 8-10 | 25.2 | 0.32 | no |
| 1-7, 9-10 | 23.6 | 1.61 | yes |
| 1-8, 10 | 28.2 | 2.01 | yes |
| 1-9 | 25.1 | 0.39 | no |

Average Speed for All 10 Samples = 25.7
Standard Deviation of All 10 Samples = 14.2

*Fig. 2C*

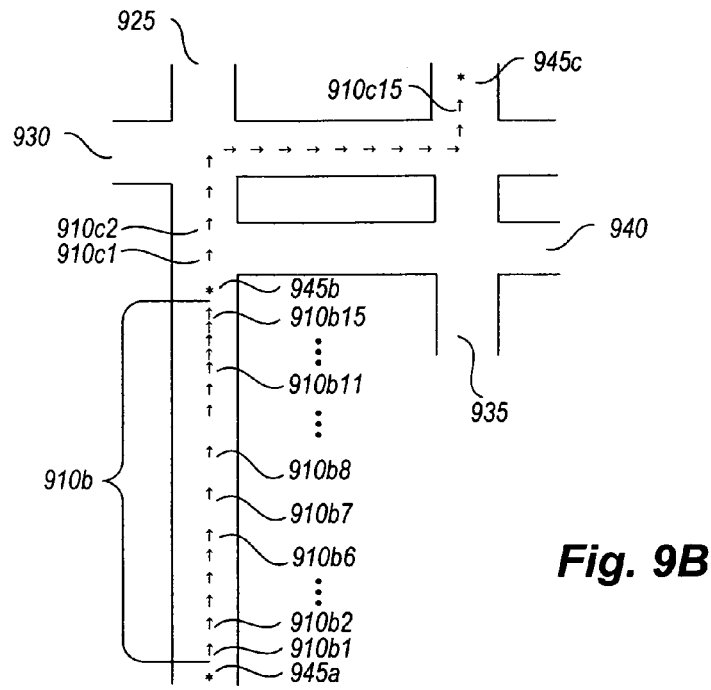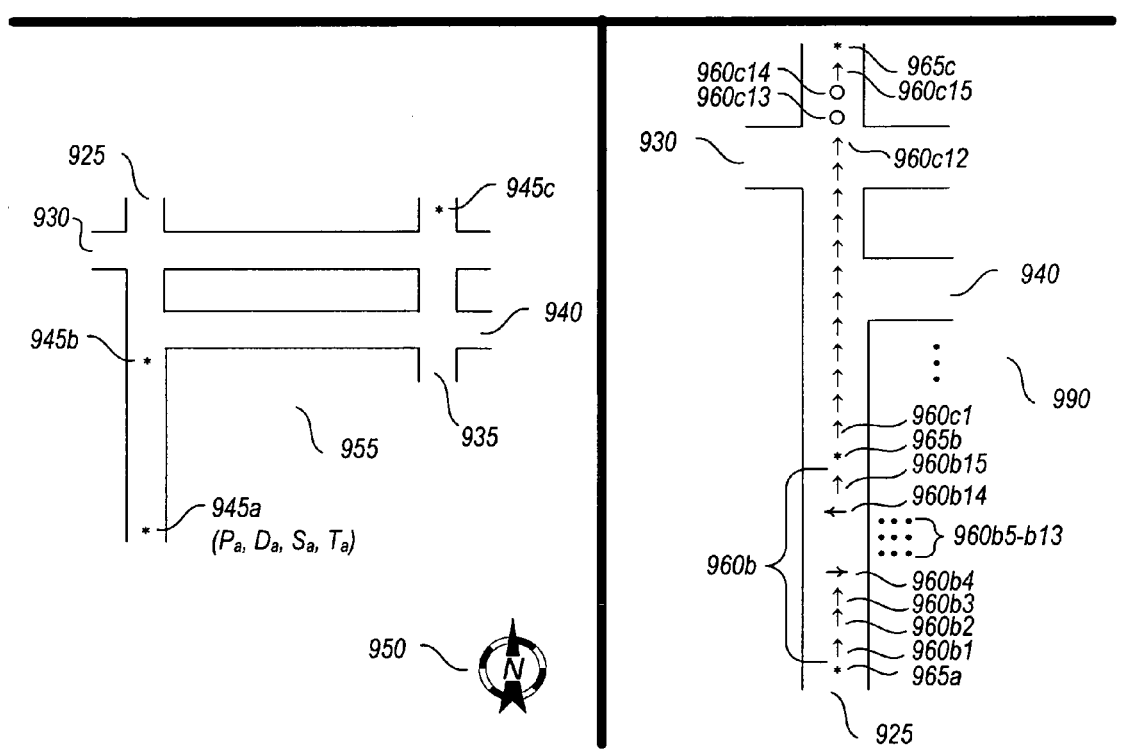
Fig. 9B
Fig. 9A
Fig. 9C

FILTERING ROAD TRAFFIC CONDITION DATA OBTAINED FROM MOBILE DATA SOURCES

CROSS REFERENCE TO RELATED APPLICATIONS

This application claims the benefit of U.S. Provisional Patent Application No. 60/778,946, filed Mar. 3, 2006 and entitled "Obtaining Road Traffic Condition Information From Mobile Data Sources," and of U.S. Provisional Patent Application No. 60/789,741, filed Apr. 5, 2006 and entitled "Assessing Road Traffic Conditions Using Data From Mobile Data Sources," each of which is hereby incorporated by reference in its entirety.

This application is also related to U.S. patent application Ser. No. 11/367,463, filed Mar. 3, 2006 and entitled "Dynamic Time Series Prediction Of Future Traffic Conditions"; to U.S. patent application Ser. No. 11/431,980, filed May 11, 2006 and entitled "Identifying Unrepresentative Road Traffic Condition Data Obtained From Mobile Data Sources," now abandoned; to U.S. patent application Ser. No. 11/432,603, filed May 11, 2006 and entitled "Assessing Road Traffic Speed Using Data Obtained From Mobile Data Sources," now abandoned; and to U.S. patent application Ser. No. 11/438,822, filed May 22, 2006 and entitled "Assessing Road Traffic Flow Conditions Using Data Obtained From Mobile Data Sources," now U.S. Pat. No. 7,831,380; each of which is hereby incorporated by reference in its entirety.

TECHNICAL FIELD

The following disclosure relates generally to techniques for assessing traffic-related data, such as by filtering mobile data source data samples that are inappropriate for roads of interest.

BACKGROUND

As road traffic has continued to increase at rates greater than increases in road capacity, the effects of increasing traffic congestion have had growing deleterious effects on business and government operations and on personal well-being. Accordingly, efforts have been made to combat the increasing traffic congestion in various ways, such as by obtaining information about current traffic conditions and providing the information to individuals and organizations. Such current traffic condition information may be provided to interested parties in various ways (e.g., via frequent radio broadcasts, an Internet Web site that displays a map of a geographical area with color-coded information about current traffic congestion on some major roads in the geographical area, information sent to cellular telephones and other portable consumer devices, etc.).

One source for obtaining information about current traffic conditions includes observations supplied by humans (e.g., traffic helicopters that provide general information about traffic flow and accidents, reports from drivers via cellphones, etc.), while another source in some larger metropolitan areas is networks of traffic sensors capable of measuring traffic flow for various roads in the area (e.g., via sensors embedded in the road pavement). While human-supplied observations may provide some value in limited situations, such information is typically limited to only a few areas at a time and typically lacks sufficient detail to be of significant use.

Traffic sensor networks can provide more detailed information about traffic conditions on some roads in some situations. However, various problems exist with respect to such information, as well as to information provided by other similar sources. For example, many roads do not have road sensors (e.g., geographic areas that do not have networks of road sensors and/or arterial roads that are not sufficiently large to have road sensors as part of a nearby network), and even roads that have road sensors may often not provide accurate data (e.g., sensors that are broken and do not provide any data or provide inaccurate data). Moreover, if information from such a road traffic network is not available in a timely manner (e.g., due to temporary transmission problems and/or inherent delays in providing road traffic network information), the value of such information is greatly diminished. Furthermore, some traffic-related information may be available only in raw and/or disaggregated form, and therefore may be of limited utility.

Thus, it would be beneficial to provide improved techniques for obtaining and assessing obtained traffic-related information, such as for use in inferring current traffic condition information for roads, as well as to provide various additional related capabilities.

BRIEF DESCRIPTION OF THE DRAWINGS

FIGS. 2A-2E illustrate examples of assessing road traffic conditions based on data obtained from vehicles and other mobile data sources.

FIGS. 9A-9C illustrate examples of actions of mobile data sources in obtaining and providing information about road traffic conditions.

DETAILED DESCRIPTION

Figure 1:
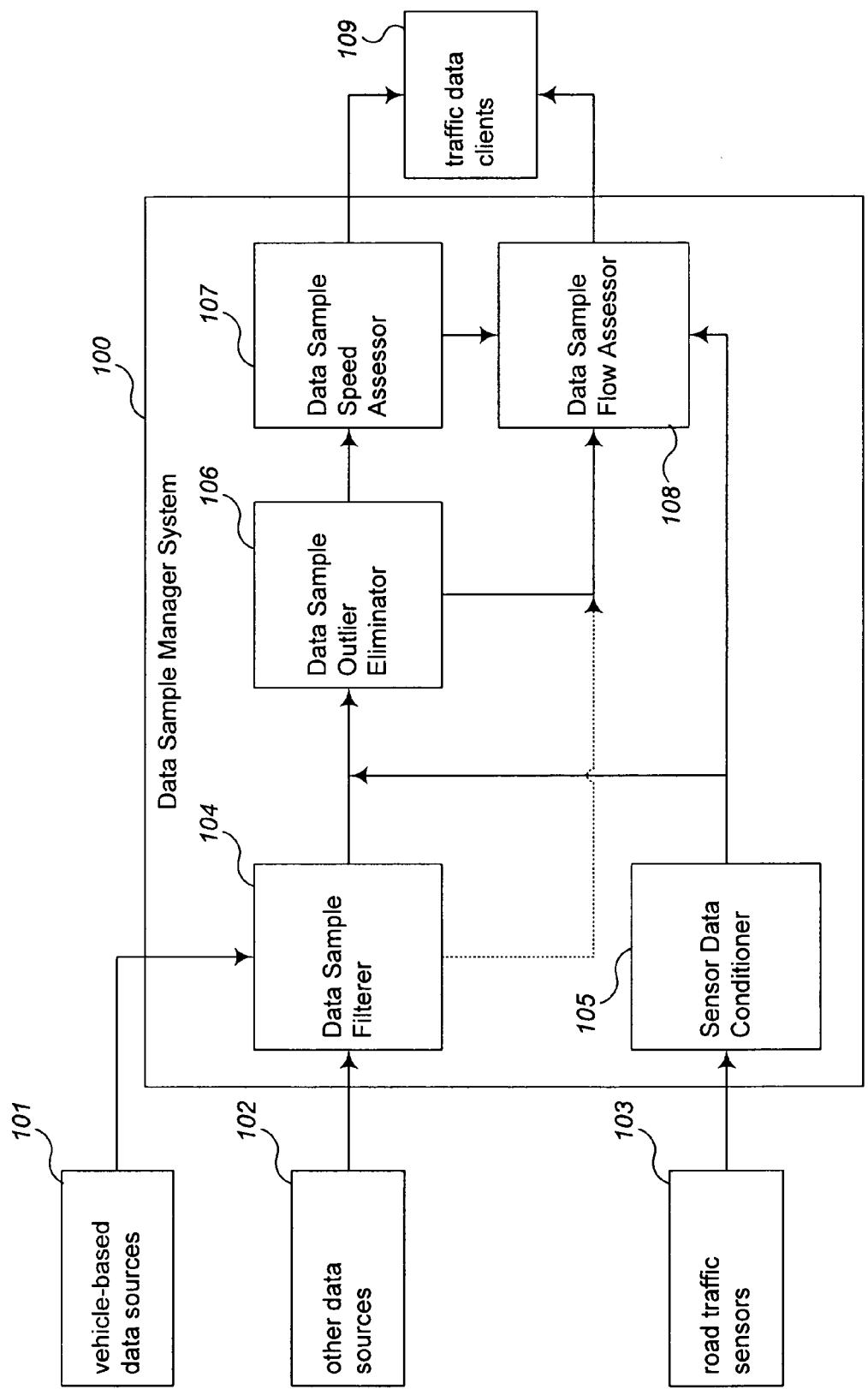
FIG. 1 is a block diagram illustrating data flow between components of an embodiment of a system for assessing road traffic conditions based at least in part on data obtained from vehicles and other mobile data sources.

Techniques are described for assessing road traffic conditions in various ways based on obtained traffic-related data, such as data samples from vehicles and other mobile data sources traveling on the roads. In addition, in at least some embodiments the data samples from the mobile data sources may be supplemented with data from one or more other sources, such as by obtaining data readings from physical sensors that are near or embedded in the roads. The assessment of road traffic conditions based on obtained data samples and/or other data readings may include various filtering and/or conditioning of the data samples and readings, and various inferences and probabilistic determinations of traffic-related characteristics of interest.

As noted, in some embodiments obtained road traffic condition information data may include multiple data samples provided by mobile data sources (e.g., vehicles), data readings from road-based traffic sensors (e.g., loop sensors embedded in road pavement), and data from other data sources. The data may be analyzed in various manners to facilitate determination of traffic condition characteristics of interest, such as estimated average traffic speed and estimated total volume of vehicles, and to enable such traffic condition determinations to be performed in a realtime or near-realtime manner (e.g., within a few minutes of receiving the underlying data samples and/or readings). For example, obtained data may be conditioned in various ways in order to detect and/or correct errors in the data. Obtained data may further be filtered in various ways to remove data from consideration if it is inaccurate or otherwise unrepresentative of actual traffic condition characteristics of interest, including by identifying data samples that are not of interest based at least in part on roads with which the data samples are associated and/or data samples that are statistical outliers with respect to other data samples—in some embodiments, the filtering may further include performing the associating of the data samples with particular roads. The filtered data samples may further include data samples that otherwise reflect vehicle locations or activities that are not of interest (e.g., parked vehicles, vehicles circling in a parking lot or structure, etc.) and/or data samples that are otherwise unrepresentative of actual vehicle travel on roads of interest. Assessing obtained data may include determining traffic conditions (e.g., traffic flow and/or average traffic speed) for various portions of a road network in a particular geographic area, based at least in part on obtained data samples. The assessed data may then be utilized in order to perform other functions related to analyzing, predicting, forecasting, and/or providing traffic-related information. In at least some embodiments, a data sample manager system uses at least some of the described techniques to prepare data for use by traffic data clients, such as a predictive traffic information provider system that generates multiple predictions of traffic conditions at multiple future times, as described in greater detail below.

Information about road traffic conditions may be obtained from mobile data sources in various manners in various embodiments. In at least some embodiments, the mobile data sources include vehicles on the road, which may each include one or more computing systems that provide data about movement of the vehicle. For example, each vehicle may include a GPS ("Global Positioning System") device and/or other geo-location device capable of determining the geographic location, speed, direction, and/or other data related to the vehicle's travel, and one or more devices on the vehicle (whether the geo-location device(s) or a distinct communication device) may from time to time provide such data (e.g., by way of a wireless link) to one or more systems able to use the data (e.g., a data sample manager system, as described in more detail below). Such vehicles may include, for example, a distributed network of vehicles operated by individual unrelated users, fleets of vehicles (e.g., for delivery companies, taxi and bus companies, transportation companies, governmental bodies or agencies, vehicles of a vehicle rental service, etc.), vehicles that belong to commercial networks providing related information (e.g., the OnStar service), a group of vehicles operated in order to obtain such traffic condition information (e.g., by traveling over predefined routes, or by traveling over roads as dynamically directed, such as to obtain information about roads of interest), vehicles with on-board cellphone devices (e.g., as built-in equipment and/or in the possession of a vehicle occupant) capable of providing location information (e.g., based on GPS capabilities of the devices and/or based on geo-location capabilities provided by the cellular network), etc.

In at least some embodiments, the mobile data sources may include or be based on computing devices and other mobile devices of users who are traveling on the roads, such as users who are operators and/or passengers of vehicles on the roads. Such user devices may include devices with GPS capabilities (e.g., cellphones and other handheld devices), or location and/or movement information may instead be produced in other manners in other embodiments. For example, devices in vehicles and/or user devices may communicate with external systems that can detect and track information about devices (e.g., for devices passing by each of multiple transmitters/receivers in a network operated by the system), thus allowing location and/or movement information for the devices to be determined in various manners and with various levels of detail, or such external systems may otherwise be able to detect and track information about vehicles and/or users without interacting with devices (e.g., camera systems that can observe and identify license plates and/or users' faces). Such external systems may include, for example, cellular telephone towers and networks, other wireless networks (e.g., a network of Wi-Fi hotspots), detectors of vehicle transponders using various communication techniques (e.g., RFID, or "Radio Frequency Identification"), other detectors of vehicles and/or users, etc.

The road traffic condition information obtained from the mobile data sources may be used in various ways, whether alone or in combination with other road traffic condition information from one or more other sources (e.g., from road traffic sensors). In some embodiments, such road traffic condition information obtained from mobile data sources is used to provide information similar to that from road sensors but for roads that do not have functioning road sensors (e.g., for roads that lack sensors, such as for geographic areas that do not have networks of road sensors and/or for arterial roads that are not significantly large to have road sensors, for road sensors that are broken, etc.), to verify duplicative information that is received from road sensors or other sources, to identify road sensors that are providing inaccurate data (e.g., due to temporary or ongoing problems), etc. Moreover, road traffic conditions may be measured and represented in one or more of a variety of ways, such as in absolute terms (e.g., average speed; volume of traffic for an indicated period of time; average occupancy time of one or more traffic sensors or other locations on a road, such as to indicate the average percentage of time that a vehicle is over or otherwise activating a sensor; one of multiple enumerated levels of road congestion, such as measured based on one or more other traffic condition measures; etc.) and/or in relative terms (e.g., to represent a difference from typical or from maximum).

In some embodiments, some road traffic condition information may take the form of data samples provided by various data sources. Individual data samples may include varying amounts of information. For example, data samples provided by mobile data sources may include one or more of a source identifier, a speed indication, an indication of a heading, an indication of a location, a timestamp, and a status identifier. The source identifier may be a number or string that identifies the vehicle (or person or other device) acting as a mobile data source. In some embodiments, the mobile data source identifier may be permanently or temporarily (e.g., for the life of the mobile data source; for one hour; for a current session of use, such as to assign a new identifier each time that a vehicle or data source device is turned on; etc.) associated with the mobile data source. In at least some embodiments, source identifiers are associated with mobile data sources in such a manner as to minimize privacy concerns related to the data from the mobile data sources (whether permanently or temporarily associated), such as by creating and/or manipulating the source identifiers in a manner that prevents the mobile data source associated with an identifier from being identified based on the identifier. The speed indication may reflect the instant or average velocity of the mobile data source expressed in various ways (e.g., miles per hour). The heading may reflect a direction of travel and be an angle expressed in degrees or other measure (e.g., in compass-based headings or radians). The indication of location may reflect a physical location expressed in various ways (e.g., latitude/longitude pairs or Universal Transverse Mercator coordinates). The timestamp may denote the time at which a given data sample was recorded by the mobile data source, such as in local time or UTC ("Universal Coordinated Time") time. A status indicator may indicate the status of the mobile data source (e.g., that the vehicle is moving, stopped, stopped with engine running, etc.) and/or the status of at least some of the sensing, recording, and/or transmitting devices (e.g., low battery, poor signal strength, etc.).

In some embodiments, the network of roads in a given geographic region may be modeled or represented by the use of multiple road segments. Each road segment may be used to represent a portion of a road (or of multiple roads), such as by dividing a given physical road into multiple road segments (e.g., with each road segment being a particular length, such as a one-mile length of the road, or with road segments being selected to reflect portions of the road that share similar traffic condition characteristics)—such multiple road segments may be successive portions of the road, or may alternatively in some embodiments be overlapping or have intervening road portions that are not part of any road segments. In addition, a road segment may represent one or more lanes of travel on a given physical road. Accordingly, a particular multi-lane road that has one or more lanes for travel in each of two directions may be associated with at least two road segments, with at least one road segment associated with travel in one direction and with at least one other road segment associated with travel in the other direction. In addition, multiple lanes of a single road for travel in a single direction may be represented by multiple road segments in some situations, such as if the lanes have differing travel condition characteristics. For example, a given freeway system may have express or high occupancy vehicle ("HOV") lanes that may be beneficial to represent by way of road segments distinct from road segments representing the regular (e.g., non-HOV) lanes traveling in the same direction as the express or HOV lanes. Road segments may further be connected to or otherwise associated with other adjacent road segments, thereby forming a network of road segments.

FIG. 1 is a block diagram illustrating data flow between components of an embodiment of a Data Sample Manager system. The illustrated data flow diagram is intended to reflect a logical representation of data flow between data sources, components of an embodiment of a Data Sample Manager system, and traffic data clients. That is, actual data flow may occur via a variety of mechanisms including direct flows (e.g., implemented by parameter passing or network communications such as messages) and/or indirect flows via one or more database systems or other storage mechanisms, such as file systems. The illustrated Data Sample Manager system 100 includes a Data Sample Filterer component 104, a Sensor Data Conditioner component 105, a Data Sample Outlier Eliminator component 106, a Data Sample Speed Assessor component 107, and a Data Sample Flow Assessor component 108.

In the illustrated embodiment, the components 104-108 of the Data Sample Manager system 100 obtain data samples from various data sources, including vehicle-based data sources 101, road traffic sensors 103, and other data sources 102. Vehicle-based data sources 101 include multiple vehicles traveling on one or more roads, which may each include one or more computing systems and/or other devices that provide data about the travel of the vehicle. As described in more detail elsewhere, each vehicle may include GPS and/or other geo-location devices capable of determining location, speed, and/or other data related to the vehicle's travel. Such data may be obtained by the components of the described Data Sample Manager system by wireless data links (e.g., satellite uplink and/or cellular network) or in other manners (e.g., via a physical wired/cabled connection that is made after a vehicle arrives at the location with the physical location, such as when a fleet vehicle returns to its home base). Road traffic sensors 102 include multiple sensors that are installed in, at, or near various streets, highways, or other roads, such as loop sensors embedded in the pavement that are capable of measuring the number of vehicles passing above the sensor per unit time, vehicle speed, and/or other data related to traffic flow. Data may similarly be obtained from the road traffic sensors 102 via wire-based or wireless-data links. Other data sources 103 may include a variety of types of data sources, including map services and/or databases that provide information regarding road networks such as the connections between roads as well as traffic control information related to such roads (e.g., the existence and/or location of traffic control signals and/or speed zones).

Although the illustrated data sources 101-103 in this example provide data samples directly to various components 104-108 of the Data Sample Manager system 100, the data samples may instead be processed in various ways in other embodiments prior to their provision to those components. Such processing may include organizing and/or aggregating data samples into logical collections based on time, location, geographic region, and/or the identity of the individual data source (e.g., vehicle, traffic sensor, etc.). In addition, such processing may include merging or otherwise combining data samples into higher-order, logical data samples or other values. For example, data samples obtained from multiple geographically co-located road traffic sensors may be merged into a single, logical data sample by way of averaging or other aggregation. Furthermore, such processing may include deriving or otherwise synthesizing data samples or elements of data samples based on one or more obtained data samples. For example, in some embodiments, at least some vehicle-based data sources may each provide data samples that include only a source identifier and a geographic location, and if so groups of multiple distinct data samples provided periodically over a particular time interval or other time period can thereby be associated with one another as having been provided by a particular vehicle. Such groups of data samples may then be further processed in order to determine other travel-related information, such as a heading for each data sample (e.g. by calculating the angle between the position of a data sample and the position of a prior and/or subsequent data sample) and/or a speed for each data sample (e.g., by calculating the distance between the position of a data sample and the position of a prior and/or subsequent data sample, and by dividing the distance by the corresponding time).

The Data Sample Filterer component 104 obtains data samples from the vehicle-based data sources 101 and the other data sources 102 in the illustrated embodiment, and then filters the obtained data samples before providing them to the Data Sample Outlier Eliminator component 106 and optionally to the Data Sample Flow Assessor component 108. As discussed in greater detail elsewhere, such filtering may include associating data samples with road segments corresponding to roads in a geographic area and/or identifying data samples that do not correspond to road segments of interest or that otherwise reflect vehicle locations or activities that are not of interest. Associating data samples with road segments may include using the reported location and/or heading of each data sample to determine whether the location and heading correspond to a previously defined road segment. Identifying data samples that do not correspond to road segments of interest may include removing or otherwise identifying such data samples so that they will not be modeled, considered, or otherwise processed by other components of the Data Sample Manager system 100—such data samples to be removed may include those corresponding to roads of certain functional road classes (e.g., residential streets) that are not of interest, those corresponding to particular roads or road segments that are not of interest, those corresponding to portions or sections of roads that are not of interest (e.g., ramps and collector/distributor lanes/roads for freeways), etc. Identifying data samples that otherwise reflect vehicle locations or activities that are not of interest may include identifying data samples corresponding to vehicles that are in an idle state (e.g., parked with engine running), that are driving in a parking structure (e.g., circling at a very low speed), etc. In addition, filtering may in some embodiments include identifying road segments that are (or are not) of interest for presentation or further analysis. For example, such filtering may include analyzing variability of traffic flow and/or level of congestion of various road segments within a particular time period (e.g., hour, day, week), such as to exclude some or all road segments with low intra-time period variability and/or low congestion (e.g., for road segments for which sensor data readings are not available or whose functional road class otherwise indicates a smaller or less-traveled road) from further analysis as being of less interest than other roads and road segments.

The Sensor Data Conditioner component 105 detects and corrects errors in data samples that include readings obtained from the road traffic sensors 103. Detecting errors may be based on various techniques, including statistical measures that compare the distribution of current data samples reported by a given road traffic sensor to the historical distribution of data samples reported by a given road traffic sensor during a corresponding time period (e.g., same day of week). The extent to which the actual and historical distributions differ may be calculated by statistical measures such as the Kullback-Leibler divergence, which provides a convex measure of the similarity between two probability distributions, or statistical entropy. In addition, some road sensors may report indications of sensor health, and such indications may also be utilized to detect errors in obtained data samples. If errors are detected in obtained data samples, erroneous data samples may be corrected in various ways, including replacing such data samples with averages of adjacent (e.g., neighbor) data samples from adjacent/neighbor road sensors that have not been determined to be erroneous. In addition, erroneous data samples may be corrected by reference to previously or concurrently forecasted and/or predicted values as provided by a predictive traffic information system. Additional details regarding predictive traffic information systems are provided elsewhere.

The Data Sample Outlier Eliminator component 106 obtains filtered data samples from the Data Sample Filterer component 104 and/or conditioned data samples from the Sensor Data Conditioner component 105, and then identifies and eliminates from consideration those data samples that are not representative of actual vehicle travel on the roads and road segments of interest. In the illustrated embodiment, for each road segment of interest, the component analyzes a group of data samples that were recorded during a particular time period and associated with the road segment (e.g., by the Data Sample Filterer component 104) in order to determine which, if any, should be eliminated. Such determinations of unrepresentative data samples may be performed in various ways, including based on techniques that detect data samples that are statistical outliers with respect to the other data samples in the group of data samples. Additional details regarding data sample outlier elimination are provided elsewhere.

The Data Sample Speed Assessor component 107 obtains data samples from the Data Sample Outlier Eliminator component 106, such that the obtained data samples in the illustrated embodiment are representative of actual vehicle travel on the roads and road segments of interest. The Data Sample Speed Assessor component 107 then analyzes the obtained data samples to assess one or more speeds for road segments of interest for at least one time period of interest based on a group of the data samples that have been associated with the road segment (e.g., by the Data Sample Filterer component 104) and the time period. In some embodiments, the assessed speed(s) may include an average of the speeds for multiple of the data samples of the group, possibly weighted by one or more attributes of the data samples (e.g., age, such as to give greater weight to newer data samples, and/or source or type of the data samples, such as to vary the weight for data samples from mobile data sources or from road sensors so as to give greater weight to sources with higher expected reliability or availability) or by other factors. More details regarding speed assessment from data samples are provided elsewhere.

The Data Sample Flow Assessor component 108 assesses traffic flow information for road segments of interest for at least one time period of interest, such as to assess traffic volume (e.g., expressed as a total or average number of vehicles arriving at or traversing a road segment over a particular amount of time, such as per minute or hour), to assess traffic density (e.g., expressed as an average or total number of vehicles per unit of distance, such as per mile or kilometer), to assess traffic occupancy (e.g., expressed as an average or total amount of time that vehicles occupy a particular point or region over a particular amount of time, such as per minute or hour), etc. The assessment of the traffic flow information in the illustrated embodiment is based at least in part on traffic speed-related information provided by the Data Sample Speed Assessor component 107 and the Data Sample Outlier Eliminator component 106, and optionally on traffic data sample information provided by the Sensor Data Conditioner component 105 and the Data Sample Filterer component 104. Additional details regarding data sample flow assessment are provided elsewhere.

The one or more traffic data clients 109 in the illustrated embodiment obtain assessed road traffic condition information (e.g., speed and/or flow data) provided by the Data Sample Speed Assessor component 107 and/or the Data Sample Flow Assessor component 108, and may utilize such data in various ways. For example, traffic data clients 109 may include other components and/or traffic information systems operated by the operator of the Data Sample Manager system 100, such as a predictive traffic information provider system that utilizes traffic condition information in order to generate predictions of future traffic conditions at multiple future times, and/or a realtime (or near-realtime) traffic information presentation or provider system that provides realtime (or near-realtime) traffic condition information to end-users and/or third-party clients. In addition, traffic data clients 109 may include computing systems operated by third parties in order to provide traffic information services to customers.

For illustrative purposes, some embodiments are described below in which specific types of road traffic conditions are assessed in specific ways, and in which such assessed traffic information is used in various specific ways. However, it will be understood that such road traffic condition assessments may be generated in other manners and using other types of input data in other embodiments, that the described techniques can be used in a wide variety of other situations, and that the invention is thus not limited to the exemplary details provided.

Figure 2A:
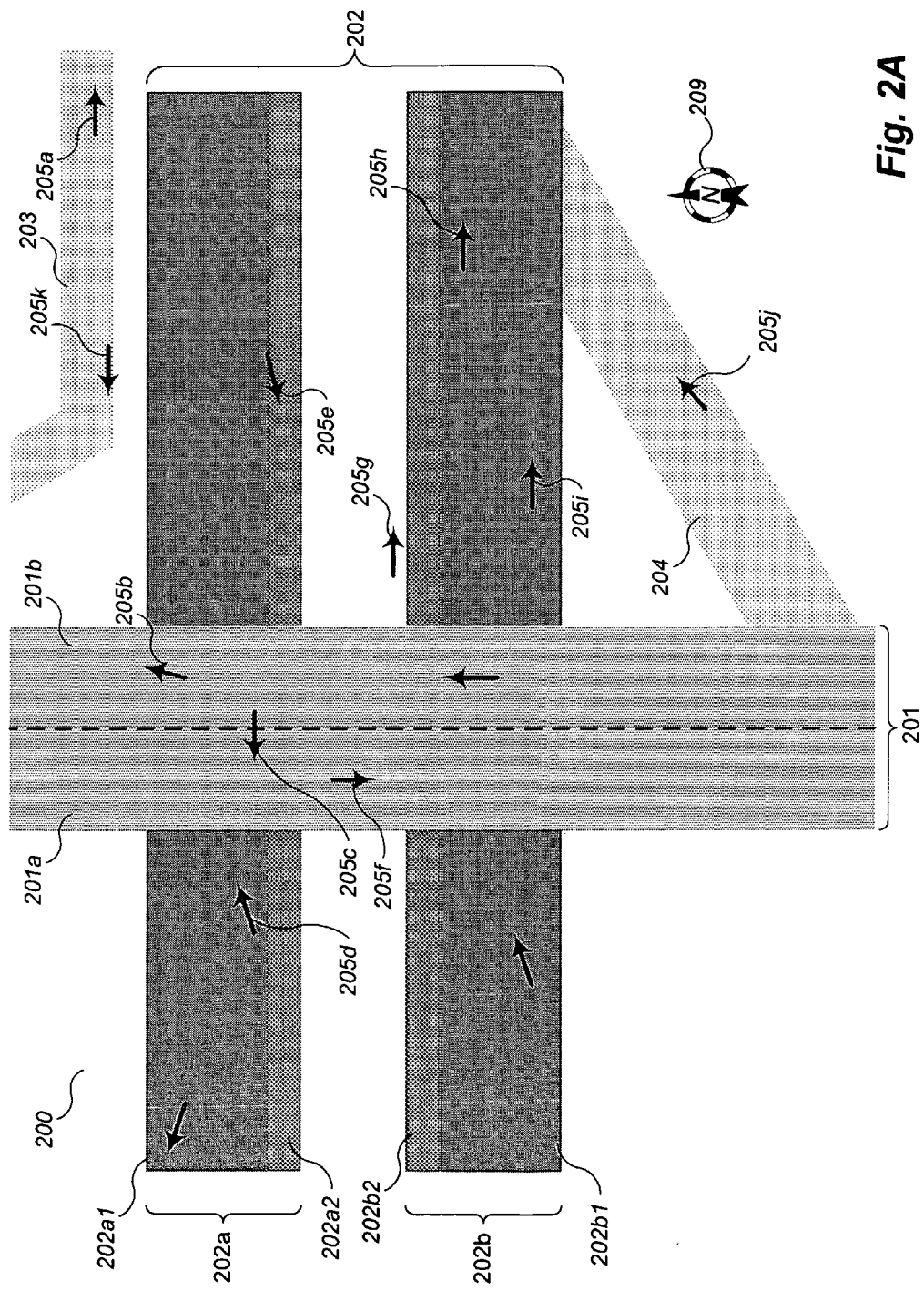

FIGS. 2A-2E illustrate examples of assessing road traffic conditions based on data obtained from vehicles and other mobile data sources, such as may be performed by an embodiment of the described Data Sample Manager system. In particular, FIG. 2A illustrates an example of data sample filtering for an example area 200 with several roads 201, 202, 203, and 204, and with a legend indication 209 indicating the direction of north. In this example, road 202 is a divided, limited access road such as a freeway or toll road, with two distinct groups of lanes 202a and 202b for vehicle travel in the west and east directions, respectively. Lane group 202a includes an HOV lane 202a2 and multiple other regular lanes 202a1, and lane group 202b similarly includes an HOV lane 202b2 and multiple other regular lanes 202b1. Road 201 is an arterial road with two lanes 201a and 201b for vehicle travel in the south and north directions, respectively. Road 201 passes over road 202 (e.g., via an overpass or bridge), and road 204 is an on-ramp that connects the northbound lane 201b of road 201 to the eastbound lane group 202b of road 202. Road 203 is a local frontage road adjoining road 202.

The roads depicted in FIG. 2A may be represented in various ways for use by the described Data Sample Manager system. For example, one or more road segments may be associated with each physical road, such as to have northbound and southbound road segments associated with the northbound lane 201b and southbound lane 201b, respectively. Similarly, at least one westbound road segment and at least one eastbound road segment may be associated with the westbound lane group 202a and the eastbound lane group 202b of road 202, respectively. For example, the portion of the eastbound lane group 202b east of road 201 may be a separate road segment from the portion of the eastbound lane group 202b west of road 201, such as based on the road traffic conditions typically or often varying between the road portions (e.g., due to a typically significant influx of vehicles to lane group 202b east of road 201 from the on-ramp 204, such as that may typically cause greater congestion in lane group 202b to the east of road 201). In addition, one or more lane groups may be decomposed into multiple road segments, such as if different lanes typically or often have differing road traffic condition characteristics (e.g., to represent any given portion of lane group 202b as a first road segment corresponding to lanes 202b1 based on those lanes sharing similar traffic condition characteristics, and as a second road segment corresponding to HOV lane 202b2 due to its differing traffic condition characteristics)—in other such situations, only a single road segment may be used for such a lane group, but some data samples (e.g., those corresponding to HOV lane 202b2) may be excluded from use (such as by a Data Sample Filterer component and/or a Data Sample Outlier Eliminator component) when assessing road traffic conditions for the lane group. Alternatively, some embodiments may represent multiple lanes of a given road as a single road segment, even if the lanes are used for travel in opposite directions, such as if the road traffic conditions are typically similar in both directions—for example, frontage road 205a may have two opposing lanes of travel, but may be represented by a single road segment. Road segments may be determined at least in part in a variety of other ways in at least some embodiments, such as to be associated with geographic information (e.g., physical dimensions and/or heading(s)) and/or traffic-related information (e.g., speed limits).

FIG. 2A further depicts multiple data samples 205a-k reported by multiple mobile data sources (e.g., vehicles, not shown) traveling in the area 200 during a particular time interval or other time period (e.g. 1 minute, 10 minutes, 15 minutes, etc.). Each of the data samples 205a-k is depicted as an arrow that indicates a heading for the data sample, as reported by one of the multiple mobile data sources. The data samples 205a-k are superimposed upon the area 200 in such a manner as to reflect locations reported for each of the data samples (e.g., expressed in units of latitude and longitude, such as based on GPS readings), which may differ from the actual locations of the vehicle when that data sample was recorded (e.g., due to an inaccurate or erroneous reading, or due to a degree of variability that is inherent for the location sensing mechanism used). For example, data sample 205g shows a location that is slightly north of the road 202b, which may reflect a vehicle that was pulled over off the north side of lane 202b2 (e.g., because of a mechanical malfunction), or it instead may reflect an inaccurate location for a vehicle that was in fact traveling in the eastbound direction in lane 202b2 or other lane. In addition, a single mobile data source may be the source of more than one of the illustrated data samples, such as if both sample 205i and sample 205h were reported by a single vehicle based on its travel eastbound along road 202 during the time period (e.g., via a single transmission containing multiple data samples for multiple prior time points, such as to report data samples every 5 minutes or every 15 minutes). More details regarding storing and providing multiple acquired data samples are included below.

The described Data Sample Manager system may in some embodiments, filter the obtained data samples, such as to map data samples to predefined road segments and/or identify data samples that do not correspond to such road segments of interest. In some embodiments, a data sample will be associated with a road segment if its reported location is within a predetermined distance (e.g., 5 meters) of the location of a road and/or lane(s) corresponding to the road segment and if its heading is within a predetermined angle (e.g., plus or minus 15 degrees) of the heading of the road and/or lanes(s) corresponding to the road segment. Road segments in the illustrated embodiment are associated with sufficient location-based information (e.g., heading of the road segment, physical bounds of the road segment, etc.) to make such a determination, although in other embodiments the association of data samples to road segments may be performed before the data samples are made available to the Data Sample Manager system.

As an illustrative example, data sample 205a may be associated with a road segment corresponding to road 203, because its reported location falls within the bounds of road 203 and its heading is the same (or nearly the same) as at least one of the headings associated with road 203. In some embodiments, when a single road segment is utilized to represent multiple lanes some of which are traveling in opposite directions, the heading of a data sample may be compared to both headings of the road segment in order to determine whether the data sample may be associated with the road segment. For example, data sample 205k has a heading approximately opposite that of data sample 205a, but it may also be associated with the road segment corresponding to road 203, if that road segment is utilized to represent the two opposing lanes of road 203.

However, due to the proximity of road 203 and lane group 202a, it may also be possible that data sample 205k reflects a vehicle traveling in lane group 202a, such as if the reported location of data sample 205k is within a margin of error for locations of vehicles traveling in one or more of the lanes of lane group 202a, since the heading of data sample 205k is the same (or nearly the same) as the heading of lane group 202a. In some embodiments, such cases of multiple possible road segments for a data sample may be disambiguated based on other information associated with the data sample—for example, in this case, an analysis of the reported speed of data sample 205k may be used to assist in the disambiguation, such as if lane group 202a corresponds to a freeway with a 65 mph speed limit, road 203 is a local frontage road with a 30 mph speed limit, and a reported speed of the data sample is 75 mph (resulting in an association with the freeway lane(s) being much more likely than an association with the local frontage road). More generally, if the reported speed of data sample 205k is more similar to the observed or posted speed for road 203 than to the observed or posted speed for lane group 202a, such information may be used as part of determining to associate the data sample with road 203 and not lane group 202a. Alternatively, if the reported speed of data sample 205k is more similar to the observed or posted speed for lane group 202a than to the observed or posted speed for road 203, it may be associated with lane group 202a and not road 203. Other types of information may similarly be used as part of such disambiguation (e.g., location; heading; status; information about other related data samples, such as other recent data samples from the same mobile data source; etc.), such as part of a weighted analysis to reflect a degree of match for each type of information for a data sample to a candidate road segment.

For example, with respect to associating data sample 205b to an appropriate road segment, its reported location occurs at an overlap between lane 201b and lane group 202a, and is near lane 201a as well as other roads. However, the reported heading of the data sample (approximately northbound) matches the heading of lane 201b (northbound) much more closely than that of other candidate lanes/roads, and thus it will likely be associated with the road segment corresponding to lane 201b in this example. Similarly, data sample 205c includes a reported location that may match multiple roads/lanes (e.g., lane 201a, lane 201b, and lane group 202a), but its heading (approximately westbound) may be used to select a road segment for lane group 202a as the most appropriate road segment for the data sample.

Continuing with this example, data sample 205d may not be associated with any road segment, because its heading (approximately eastbound) is in the opposite direction as that of lane group 202a (westbound) whose position corresponds to the data sample's reported location. If there are no other appropriate candidate road segments that are near enough (e.g., within a predetermined distance) to the reported location of data sample 205d, such as if lane group 202b with a similar heading is too far way, this data sample may be excluded during filtering from subsequent use in analysis of the data samples.

Data sample 205e may be associated with a road segment corresponding to lane group 202a, such as a road segment corresponding to HOV lane 202a2, since its reported location and heading correspond to the location and heading of that lane, such as if a location-based technique used for the location of the data sample has sufficient resolution to differentiate between lanes (e.g., differential GPS, infrared, sonar, or radar ranging devices). Data samples may also be associated with a particular lane of a multi-lane road based on factors other than location-based information, such as if the lanes have differing traffic condition characteristics. For example, in some embodiments the reported speed of a data sample may be used to fit or match the data sample to a particular lane by modeling an expected distribution (e.g., a normal or Gaussian distribution) of observed speeds (or other measures of traffic flow) of data samples for each such candidate lane and determining a best fit for the data sample to the expected distributions. For example, data sample 205e may be associated with the road segment corresponding to HOV lane 202a2 because the reported speed of that data sample is closer to an observed, inferred or historical average speed of vehicles traveling in HOV lane 202a2 than to an observed, inferred or historical average speed for vehicles traveling in regular lanes 202a1, such as by determining an observed or inferred average speed based on other data samples (e.g., using data readings provided by one or more road traffic sensors) and/or analysis of other related current data.

In a similar manner, data samples 205f, 205h, 205i, and 205j may be associated with the road segments corresponding to lane 201a, lanes 202b1, lanes 202b1, and ramp 204, respectively, because their reported locations and headings correspond to the locations and headings of those roads or lanes.

Data sample 205g may be associated with a road segment corresponding to lane group 202b (e.g., a road segment for HOV lane 202b2) even though its reported location is outside of the bounds of the illustrated road, because the reported location may be within the predetermined distance (e.g., 5 meters) of the road. Alternatively, data sample 205g may not be associated with any road segment if its reported location is sufficiently far from the road. In some embodiments, different predetermined distances may be used for data samples provided by different data sources, such as to reflect a known or expected level of accuracy of the data source. For example, data samples provided by mobile data sources that utilize uncorrected GPS signals may use a relatively high (e.g., 30 meters) predetermined distance, whereas data samples provided by mobile data sources utilizing differential-corrected GPS devices may be compared using a relatively low (e.g., 1 meter) predetermined distance.

In addition, data sample filtering may include identifying data samples that do not correspond to road segments of interest and/or are unrepresentative of actual vehicle travel on the roads. For instance, some data samples may be removed from consideration because they have been associated with roads that are not being considered by the Data Sample Manager system. For example, in some embodiments, data samples associated with roads of lesser functional road classes (e.g., residential streets and/or arterials) may be filtered. Referring back to FIG. 2A, for example, data samples 205a and/or 205k may be filtered because road 203 is a local frontage road that is of a sufficiently low functional classification to not be considered by the Data Sample Manager system, or data sample 205j may be filtered because the on-ramp is too short to be of interest separate from the freeway. Filtering may further be based on other factors, such as inferred or reported activity of mobile data sources relative to the inferred or reported activity of other mobile data sources on one or more road segments. For example, a series of data samples associated with a road segment and provided by a single mobile data source that all indicate the same location likely indicates that the mobile data source has stopped. If all other data samples associated with the same road segment indicate moving mobile data sources, the data samples corresponding to the stopped mobile data source may be filtered out as being unrepresentative of actual vehicle travel on the road segment, such as due to the mobile data source being a parked vehicle. Furthermore, in some embodiments, data samples may include reported indications of the driving status of the vehicle (e.g., that the vehicle transmission is in "park" with the engine running, such as a vehicle stopped to make a delivery), and if so such indications may similarly be used to filter such data samples as being unrepresentative of actual traveling vehicles.

Figure 2B:
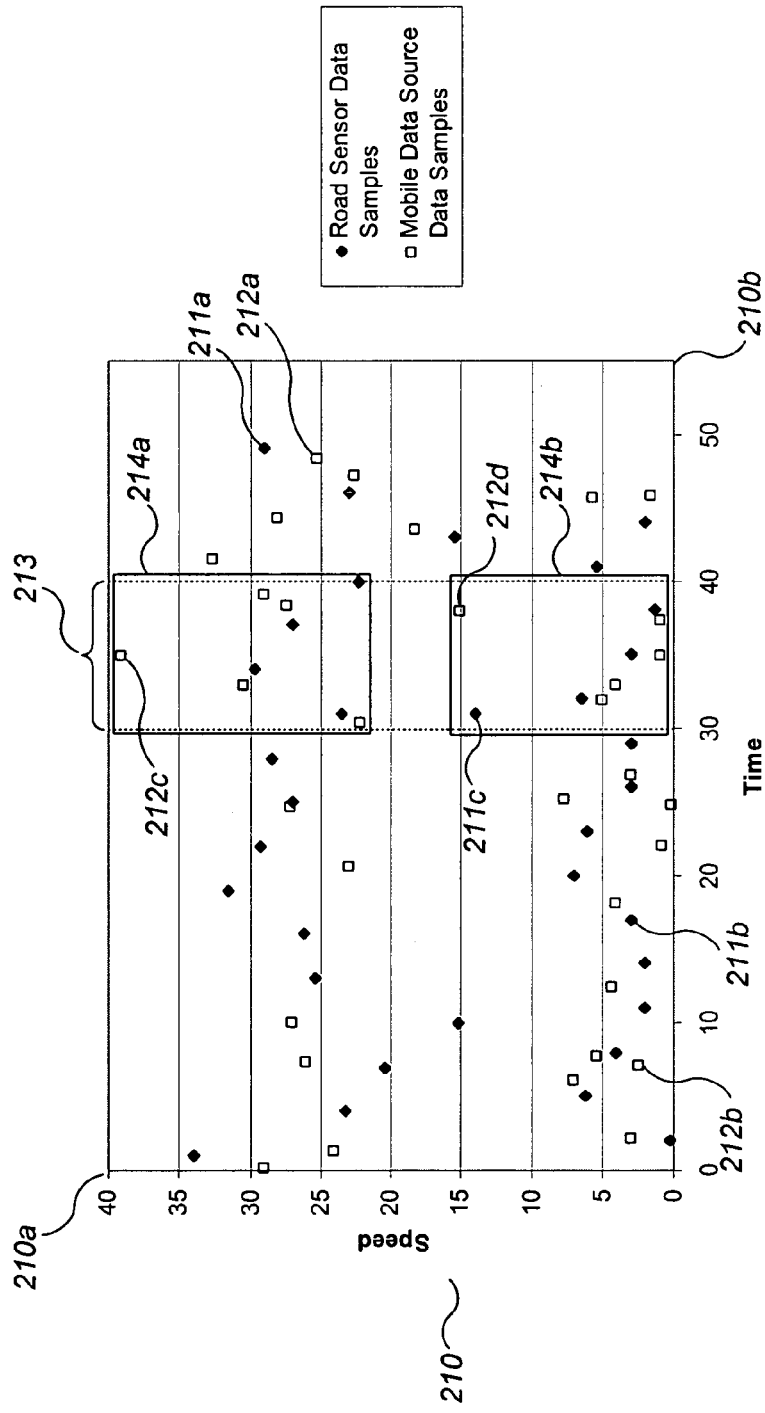

FIG. 2B illustrates a graphical view of multiple data samples associated with a single road segment obtained from multiple data sources during a particular time interval or other time period, with the data samples plotted on a graph 210 with time measured on the x-axis 210b and speed measured on the y-axis 210a. In this example, the illustrated data samples have been obtained from multiple mobile data sources as well as one or more road traffic sensors associated with the road segment, and are shown with differing shapes as illustrated in the displayed legend (i.e., with darkened diamonds ("♦") for data samples obtained from road traffic sensors, and with open squares ("□") for data samples obtained from mobile data sources). The illustrated data samples from mobile data sources may have been associated with the road segment as described with reference to FIG. 2A.

Exemplary data samples include road traffic sensor data samples 211a-c and mobile data source data samples 212a-d. The reported speed and recording time of a given data sample may be determined by its position on the graph. For example, mobile data source data sample 212d has a reported speed of 15 miles per hour (or other speed unit) and was recorded at a time of approximately 37 minutes (or other time unit) relative to some starting point. As will be described in more detail below, some embodiments may analyze or otherwise process obtained data samples within particular time windows during the time period being represented, such as time window 213. In this example, time window 213 contains data samples recorded during a 10-minute interval from time 30 minutes to time 40 minutes. In addition, some embodiments may further partition the group of data samples occurring within a particular time window into two or more groups, such as group 214a and group 214b. For example, it will be noted that the illustrated data samples appear to reflect a bi-modal distribution of reported speeds, with the bulk of the data samples reporting speeds in the range of 25-30 miles per hour or in the range of 0-8 miles per hour. Such a bi-modal or other multi-modal distribution of speeds may occur, for example, because the underlying traffic flow patterns are non-uniform, such as due to a traffic control signal that causes traffic to flow in a stop-and-go pattern, or to the road segment including multiple lanes of traffic that are moving at different speeds (e.g., an HOV or express lane with relatively higher speeds than other non-HOV lanes). In the presence of such multi-modal distributions of speed data, some embodiments may partition the data samples into two or more groups for further processing, such as to produce improved accuracy or resolution of processing (e.g., by calculating distinct average speeds that more accurately reflect the speeds of various traffic flows) as well as additional information of interest (e.g., the speed differential between HOV traffic and non-HOV traffic), or to identify a group of data samples to exclude (e.g., to not include HOV traffic as part of a subsequent analysis). While not illustrated here, such distinct groups of data samples may be identified in various ways, including by modeling a distinct distribution (e.g., a normal or Gaussian distribution) for the observed speeds of each group.

FIG. 2C illustrates an example of performing data sample outlier elimination to filter or otherwise exclude from consideration those data samples that are unrepresentative of vehicles traveling on a particular road segment, which in this example is based on the reported speed for the data samples (although in other embodiments one or more other attributes of the data samples could instead be used as part of the analysis, whether instead of or in addition to the reported speeds). In particular, FIG. 2C shows a table 220 that illustrates data sample outlier elimination being performed on an example group of ten data samples (in actual use, the numbers of data samples being analyzed may be much larger). The illustrated data samples may, for example, be all of the data samples occurring within a particular time window (such as time window 213 of FIG. 2B), or alternatively may include only a subset of the data samples of a particular time window (such as those included in group 214a or 214b of FIG. 2B) or may include all data samples available for a larger time period.

In the present example, unrepresentative data samples are identified as being statistical outliers with respect to other data samples in a determined group of data samples by determining the deviation of the speed of each data sample in a group of data samples from the average speed of the other data samples in the group. The deviation of each data sample may be measured, for example, in terms of the number of standard deviations difference from the average speed of the other data samples in the group, with data samples whose deviations are greater than a predetermined threshold (e.g., 2 standard deviations) being identified as outliers and being excluded from further processing (e.g., by being discarded).

Table 220 includes a heading row 222 that describes the contents of multiple columns 221a-f. Each row 223a-j of table 220 illustrates a data sample outlier elimination analysis for a distinct one of the ten data samples, with column 221a indicating the data sample being analyzed for each row—as each data sample is analyzed, it is excluded from the other samples of the group to determine the difference that results. The data sample of row 223a may be referred to as the first data sample, the data sample of row 223b may be referred to as the second data sample, and so on. Column 221b contains the reported speed of each of the data samples, measured in miles per hour. Column 221c lists the other data samples in the group against which the data sample of a given row will be compared, and column 221d lists the approximate average speed of the group of data samples indicated by column 221c. Column 221e contains the approximate deviation between the speed of the excluded data sample from column 221b and the average speed listed in column 221d of the other data samples, measured in number of standard deviations. Column 221f indicates whether the given data sample would be eliminated, based on whether the deviation listed in column 221e is greater than 1.5 standard deviations for the purposes of this example. In addition, the average speed 224 for all 10 data samples is shown to be approximately 25.7 miles per hour, and the standard deviation 225 of all 10 data samples is shown to be approximately 14.2.

Thus, for example, row 223a illustrates that the speed of data sample 1 is 26 miles per hour. Next, the average speed of the other data samples 2-10 is calculated as approximately 25.7 miles per hour. The deviation of the speed of data sample 1 from the average speed of the other data samples 2-10 is then calculated as being approximately 0.02 standard deviations. Finally, data sample 1 is determined to not be an outlier since its deviation is below the threshold of 1.5 standard deviations. Further, row 223c illustrates that the speed of data sample 3 is 0 miles per hour and that the average speed of the other data samples 1-2 and 4-10 is calculated as approximately 28.6 miles per hour. Next, the deviation of the speed of data sample 3 from the average speed of the other data samples 1-2 and 4-10 is calculated as approximately 2.44 standard deviations. Finally, data sample 3 is determined to be eliminated as an outlier because its deviation is above the threshold of 1.5 standard deviations.

More formally, given N data samples, $v_0, v_1, v_2, \ldots, v_n$, recorded in a given time period and associated with a given road segment, a current data sample $v_i$ will be eliminated if $$\frac{|v_i - \bar{v}_i|}{\sigma_i} \geq c$$

where $v_i$ is speed of the current data sample being analyzed; $\bar{v}_i$ is the average of the speed of the other data samples $(v_0, \ldots, v_{i-1}, v_{i+1}, \ldots, v_n)$; $\sigma_i$ is the standard deviation of the other data samples; and c is a constant threshold (e.g., 1.5). In addition, as a special case to handle a potential division by zero, the current sample $v_i$ will be eliminated if the standard deviation of the other data samples, $\sigma_i$, is zero and the speed of the current data sample is not equal to the average speed of the other data samples, $\bar{v}_i$.

Note that for each $v_i$, it is not necessary to iterate over all of the other data samples $(v_0, \ldots, v_{i-1}, v_{i+1}, \ldots, v_n)$ in order to compute the average $\bar{v}_i$ and the standard deviation $\sigma_i$. The average $\bar{v}_i$ of the other data samples $v_0, \ldots, v_{i-1}, v_{i+1}, \ldots, v_n$ may be expressed as follows:

$$\bar{v}_i = \frac{N\bar{v} - v_i}{N - 1}$$

and the standard deviation $\sigma_1$ of the other data samples $v_0, \ldots, v_{i-1}, v_{i+1}, \ldots, v_n$ may be expressed as follows:

$$\sigma_i = \sqrt{\frac{1}{N-2}\left[(N-1)\sigma^2 - \frac{N(v_i - \bar{v})^2}{N-1}\right]}$$

where N is the total number of data samples (including the current data sample); $\bar{v}$ is the average of all of the data samples $v_0, v_1, v_2, \ldots, v_n$; $v_i$ is the current data sample, and $\sigma$ is the standard deviation of all of the data samples $v_0, v_1, v_2, \ldots, v_n$. By utilizing the above formulas, the averages and standard deviations may be efficiently calculated, and in particular may be calculated in constant time. Since the above algorithm calculates an average and a standard deviation for each data sample in each road segment, the algorithm runs in O(MN) time, where M is the number of road segments and N is the number of data samples per road segment.

In other embodiments, other outlier detection and/or data elimination algorithms may be used, whether instead of or in addition to the described outlier detection, such as techniques based on neural network classifiers, naïve Bayesian classifiers, and/or regression modeling, as well as techniques in which groups of multiple data samples are considered together (e.g., if at least some data samples are not independent of other data samples).

Figure 2D:
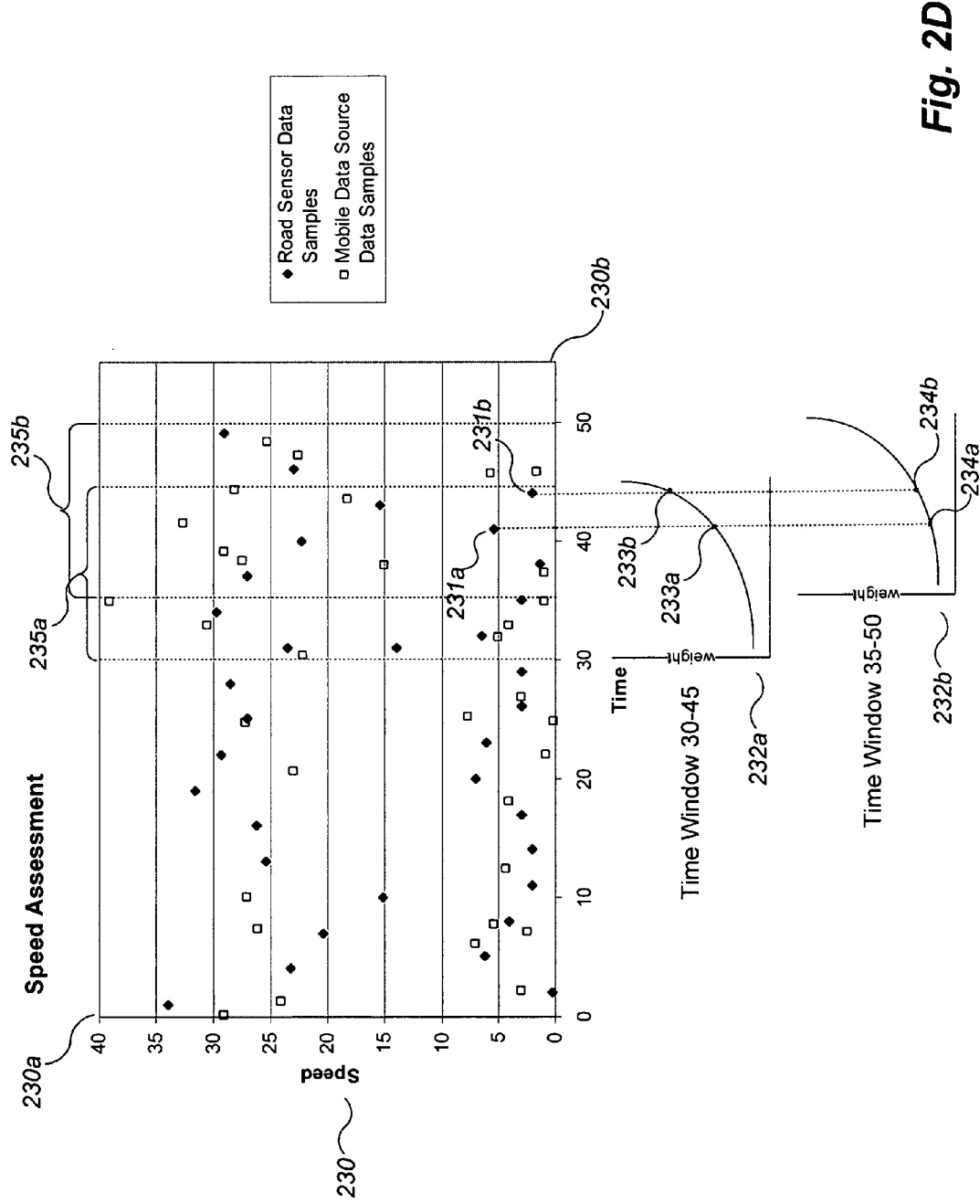

FIG. 2D illustrates an example of performing average speed assessment using data samples, and shows example data samples similar to those depicted in FIG. 2B for a particular road segment and period of time. The data samples have been plotted on a graph 230, with time measured on the x-axis 230b and speed measured on the y-axis 230a. In some embodiments, the average speed for a given road segment may be computed on a periodic basis (e.g. every 5 minutes). Each computation may consider multiple data samples within a predetermined time window (or interval), such as 10 minutes or 15 minutes. If average speeds are computed over such time windows, such as at or near the end of the time windows, data samples within a time window may be weighted in various manners when aggregating the speeds of the data samples, such as to take into account the age of data samples (e.g., to discount older data samples based on the intuition and the expectation that they do not provide as accurate information as to the actual traffic conditions at the end of the time window or other current time as younger data samples recorded relatively nearer the current time due to changing traffic conditions). Similarly, other data sample attributes may be considered in some embodiments when weighting data samples, such as a type of data source or a particular data source for a data sample (e.g., to weight data samples more heavily if they come from a type of data source or a particular data source that is believed to be more accurate than others or to otherwise provide better data than others), as well as one or more other types of weighting factors.

In the illustrated example, an average speed for the example road segment is computed every five minutes over a 15-minute time window. The example depicts the relative weights of two illustrative data samples, 231a and 231b, as they contribute to the computed average speed of each of two time windows, 235a and 235b. The time window 235a includes data samples recorded between times 30 and 45, and the time window 235b includes data samples recorded between times 35 and 50. Data samples 231a and 231b both fall within both time windows 235a and 235b.

In the illustrated example, each data sample in a given time window is weighted in proportion to its age. That is, older data samples weigh less (and therefore contribute less to the average speed) than younger data samples. Specifically, the weight of a given data sample decreases exponentially with age in this example. This decaying weighting function is illustrated by way of two weight graphs 232a and 232b corresponding to time windows 235a and 235b, respectively. Each weight graph 232a and 232b plots data sample recording time on the x-axis (horizontal) against weight on the y-axis (vertical). Samples recorded later in time (e.g., nearer the end of the time window) weigh more than samples recorded earlier in time (e.g., nearer the beginning of the time window). The weight for a given data sample may be visualized by dropping a vertical line downwards from the data sample in graph 230 to where it intersects with the curve of the weight graph corresponding to the time window of interest. For example, weight graph 232a corresponds to time window 235a, and in accordance with the relative ages of data samples 231a (older) and 231b (younger), the weight 233a of data sample 231a is less than the weight 233b of data sample 231b. In addition, weight graph 232b corresponds to time interval 235b, and it similarly can be seen that the weight 234a of data sample 231a is less than the weight 234b of data sample 231b. In addition, it is evident that the weight of a given data sample decays over time with respect to subsequent time windows. For example, the weight 233b of data sample 231b in time window 235a is greater than the weight 234b of the same data sample 231b in the later time window 235b, because data sample 231b is relatively younger during time window 235a compared to time window 235b.

More formally, in one embodiment, the weight of a data sample recorded at time t with respect to a time ending at time T may be expressed as follows:

$$w(t) = e^{-\alpha(T-t)}$$

where e is the well-known mathematical constant and α is a variable parameter (e.g., 0.2). Given the above, a weighted average speed for N data samples $v_0, v_1, v_2, \ldots, v_n$, in a time interval ending at time T may be expressed as follows, with $t_i$ being the time which data sample $v_i$ represents (e.g., the time at which it was recorded):

$$\text{Weighted average speed} = \frac{\sum_{i}^{n} v_i e^{-\alpha(T-t_i)}}{\sum_{i}^{n} e^{-\alpha(T-t_i)}}$$

Furthermore, an error estimate for the computed average speed may be computed as follows:

$$\text{Error estimate} = \frac{\sigma}{\sqrt{N}}$$

where N is the number of data samples and σ is the standard deviation of the samples $v_0, v_1, v_2, \ldots, v_n$ from the average speed. Other forms of confidence values may similarly be determined for computed or generated average speeds in other embodiments.

As noted, data samples may be weighted based on other factors, whether instead of or in addition to recency of the data samples. For example, data samples may be time-weighted as described above but by utilizing different weight functions (e.g., to have the weight of a data sample decrease linearly, rather than exponentially, with age). In addition, data sample weighting may be further based on the total number of data samples in the time interval of interest. For example, the variable parameter α described above may depend or otherwise vary based on the total number of data samples, such that greater numbers of data samples result in higher penalties (e.g., lower weights) for older data samples, to reflect the increased likelihood that there will be more low latency (e.g., younger) data samples available for purposes of computing average speed. Furthermore, data samples may be weighted based on other factors, including type of data source. For example, it may be the case that particular data sources (e.g., particular road traffic sensors, or all traffic sensors of a particular network) are known (e.g., based on reported status information) or expected (e.g., based on historical observations) to be unreliable or otherwise inaccurate. In such cases, data samples obtained from such road traffic sensors (e.g., such as data sample 211a of FIG. 2B) may be weighted less than data samples obtained from mobile data sources (e.g., data sample 212a of FIG. 2B).

Figure 2E:
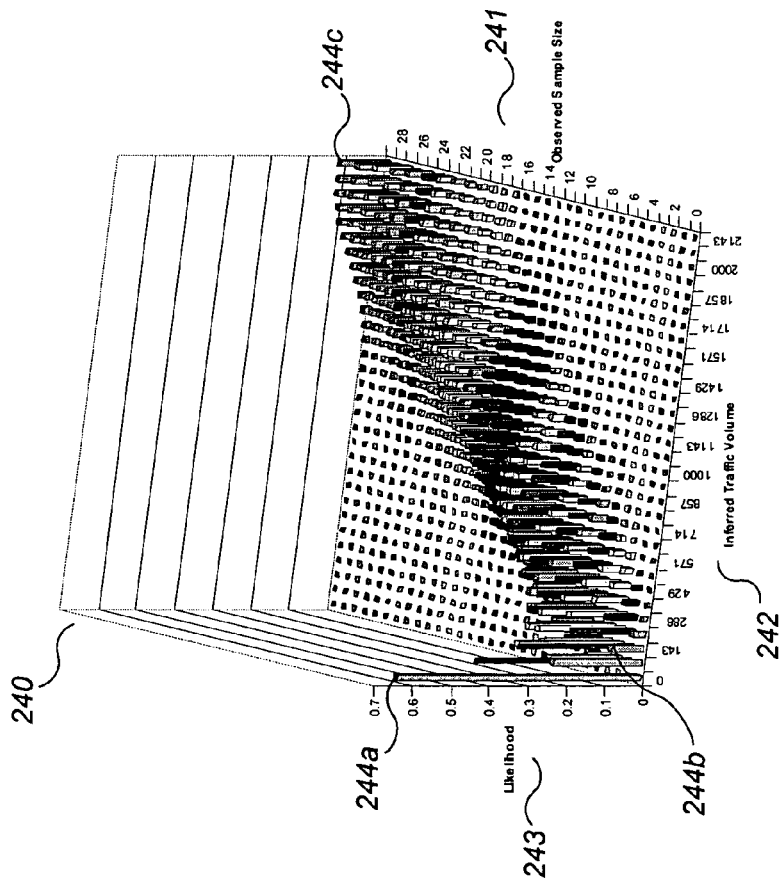

FIG. 2E facilitates an example of performing traffic flow assessment for road segments based on data samples, such as may include inferring traffic volumes, densities, and/or occupancy. In this example, traffic volume of a given road segment is expressed as a total number of vehicles flowing in a given time window over the road segment or a total number of vehicles arriving at the road segment during the time window, traffic density of a given road segment is expressed as a total number of vehicles per unit distance (e.g., miles or kilometers), and traffic occupancy is expressed as an average amount of time that a particular road segment or point on the road segment is occupied by a vehicle.

Given a number of distinct mobile data sources observed to be traveling over a given road segment during a given time window, and a known or expected percentage of total vehicles that are mobile data sources, it is possible to infer a total traffic volume—the total number of vehicles (including the vehicles that are not mobile data sources) traveling over the road segment during the time window. From the inferred total traffic volume, and assessed average speeds for vehicles on the road segment, it is possible to further calculate traffic density as well as road occupancy.

An unsophisticated approach to estimating total traffic volume of a particular road segment during a particular time window would be to simply divide the number of mobile data sample sources for that time window by the percentage of actual vehicles expected to be mobile data sample sources—thus, for example, if mobile data samples are received from 25 mobile data sources during the time window and 10% of the total vehicles on the road segment are expected to be mobile data sample sources, the estimated total volume would be 250 actual vehicles for the amount of time of the time window. However, this approach may lead to large variability of volume estimates for adjacent time windows due to the inherent variability of arrival rates of vehicles, particularly if the expected percentage of mobile data sample sources is small. As one alternative that provides a more sophisticated analysis, total traffic volume of a given road segment may be inferred as follows. Given an observation of a certain number of distinct mobile data sources (e.g., individual vehicles), n, on a road segment of length l, during a given period of time τ, Bayesian statistics can be utilized to infer an underlying mean rate of arrival of mobile data sources, λ. The arrival of mobile data sources on the stretch of road corresponding to the road segment may be modeled as a random, discrete process in time, and therefore may be described by Poisson statistics, such that:

$$p(n \mid \lambda) = \frac{\lambda^n e^{-\lambda}}{n!}$$

From the above formula, a likelihood that n mobile data sources will be observed may be calculated, given a mean arrival rate λ and an observed number of vehicles n. For example, suppose a mean arrival rate of λ=10 (vehicles/unit time) and an observation of n=5 vehicles. Substitution yields $$p(n \mid \lambda) = \frac{10^5 e^{10}}{5!} \approx 0.038$$

indicating a 3.8% likelihood of actually observing n=5 vehicles. Similarly, the likelihood of actually observing 10 vehicles arriving (i.e., n=10) if the mean arrival rate is λ=10 (vehicles/unit time) is approximately 12.5%.

The above formula may be utilized in conjunction with Bayes Theorem in order to determine the likelihood of a particular arrival rate λ given an observation of n. As is known, Bayes Theorem is:

$$p(\lambda \mid n) = \frac{p(n \mid \lambda) p(\lambda)}{p(n)}$$

By substitution and constant elimination, the following may be obtained:

$$p(\lambda \mid n) \propto \frac{\lambda^n e^{-\lambda}}{n!}$$

From the above, a proportional or relative likelihood of an arrival rate λ, given an observation of n mobile data sources, may be calculated, providing a probability distribution over possible values of λ given various observed values for n. For a particular value of n, the distribution of likelihoods over various arrival rate values allows a single representative arrival rate value to be selected (e.g., a mean or a median) and a degree of confidence in that value to be assessed.

Furthermore, given a known percentage q of total vehicles on the road that are mobile data sources, also referred to as the "penetration factor", the arrival rate volume of total traffic may be calculated as $$\text{Total traffic volume} = \frac{\lambda}{q}$$

Total traffic volume for a road segment during a time period may in some embodiments alternatively be expressed as a total number of vehicles k flowing in time τ over a length l of the road segment.

FIG. 2E illustrates the probability distribution of various total traffic volumes given observed sample sizes, given an example mobile data source penetration factor of q=0.014 (1.4%). In particular, FIG. 2E depicts a three dimensional graph 240 that plots observed number of mobile data sources (n) on the y-axis 241 against inferred traffic arrival rate volume on the x-axis 242 and against likelihood of each inferred traffic volume value on the z-axis 243. For example, the graph shows that given an observed number of mobile data sources of n=0, the likelihood that the actual traffic volume is near zero is approximately 0.6 (or 60%), as illustrated by bar 244*a*, and the likelihood that the actual traffic volume is near 143 vehicles per unit time is approximately 0.1, as illustrated by bar 244*b*. Furthermore, given an observed number of mobile data sources of n=28, the likelihood that the total actual traffic volume is near 2143 vehicles per unit time (corresponding to approximately 30 mobile data sample sources per unit time, given the example penetration factor) is approximately 0.1, as illustrated by bar 244*c*, which appears to be close to the median value for total actual traffic volume.

In addition, average occupancy and density may be calculated using the inferred total traffic arrival rate volume for a given road segment (representing a number of vehicles k arriving during time r at the road segment), the assessed average speed v, and an average vehicle length d, as follows:

$$\text{Vehicles per mile, } m = \frac{k}{v\tau}$$

$$\text{Occupancy} = md$$

As previously described, the average speed v of vehicles on the road segment may be obtained by utilizing speed assessment techniques, such as those described with reference to FIG. 2D.

Figure 3:
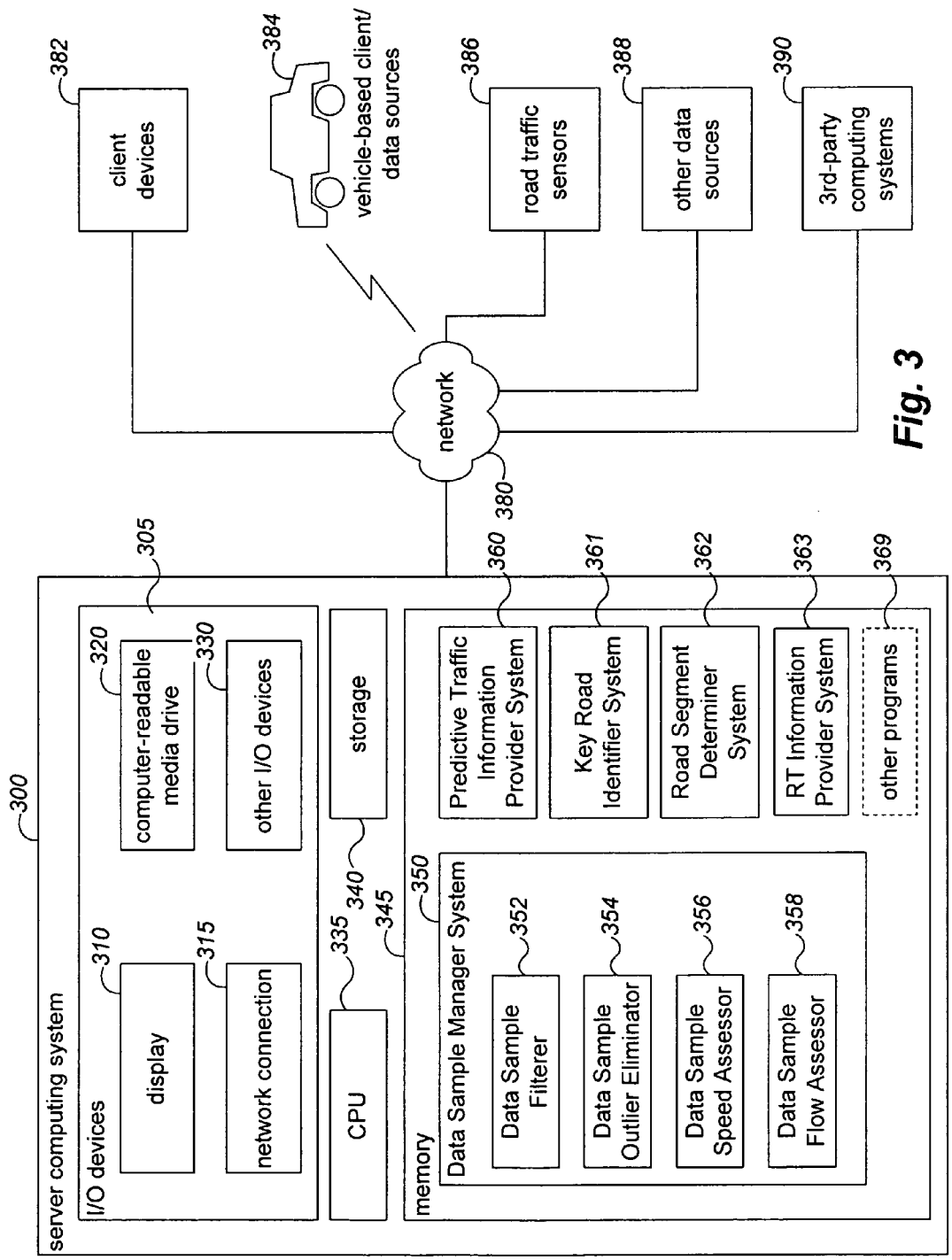
FIG. 3 is a block diagram illustrating a computing system suitable for executing an embodiment of the described Data Sample Manager system.

FIG. 3 is a block diagram illustrating an embodiment of a computing system 300 that is suitable for performing at least some of the described techniques, such as by executing an embodiment of a Data Sample Manager system. The computing system 300 includes a central processing unit ("CPU") 335, various input/output ("I/O") components 305, storage 340, and memory 345, with the illustrated I/O components including a display 310, a network connection 315, a computer-readable media drive 320, and other I/O devices 330 (e.g., keyboards, mice or other pointing devices, microphones, speakers, etc.).

In the illustrated embodiment, various systems are executing in memory 345 in order to perform at least some of the described techniques, including a Data Sample Manager system 350, a Predictive Traffic Information Provider system 360, a Key Road Identifier system 361, a Road Segment Determiner system 362, an RT Information Provider system 363, and optional other systems provided by programs 369, with these various executing systems generally referred to herein as traffic information systems. The computing system 300 and its executing systems may communicate with other computing systems via a network 380 (e.g., the Internet, one or more cellular telephone networks, etc.), such as various client devices 382, vehicle-based clients and/or data sources 384, road traffic sensors 386, other data sources 388, and third-party computing systems 390.

In particular, the Data Sample Manager system 350 obtains various information regarding current traffic conditions and/or previous observed case data from various sources, such as from the road traffic sensors 386, vehicle-based mobile data sources 384 and/or other mobile or non-mobile data sources 388. The Data Sample Manager system 350 then prepares the obtained data for use by other components and/or systems by filtering (e.g., eliminating data samples from consideration) and/or conditioning (e.g., correcting errors) the data, and then assesses road traffic conditions such as traffic flow and/or speed for various road segments using the prepared data. In this illustrated embodiment, the Data Sample Manager system 350 includes a Data Sample Filterer component 352, a Data Sample Outlier Eliminator component 354, a Data Sample Speed Assessor component 356, and a Data Sample Flow Assessor component 358, with the components 352-358 performing functions similar to those previously described for corresponding components of FIG. 1 (such as the Data Sample Filterer component 104, the Data Sample Outlier Eliminator component 106, the Data Sample Speed Assessor component 107, and the Data Sample Flow Assessor component 108). In addition, in at least some embodiments the Data Sample Manager system performs its assessment of road traffic conditions in a substantially realtime or near-realtime manner, such as within a few minutes of obtaining the underlying data (which may be itself be obtained in a substantially realtime manner from the data sources).

The other traffic information systems 360-363 and 369 and/or the third-party computing systems 390 may then use data provided by the Data Sample Manager system in various ways. For example, the Predictive Traffic Information Provider system 360 may obtain (either directly, or indirectly via a database or storage device) such prepared data to generate future traffic condition predictions for multiple future times, and provide the predicted information to one or more other recipients, such as one or more other traffic information systems, client devices 382, vehicle-based clients 384, and/or third-party computing systems 390. In addition, the RT Information Provider system 363 may obtain information about assessed road traffic conditions from the Data Sample Manager system, and make the road traffic condition information available to others (e.g., client devices 382, vehicle-based clients 384, and/or third-party computing systems 390) in a realtime or near-realtime manner—when the Data Sample Manager system also performs its assessments in such a realtime or near-realtime manner, the recipients of the data from the RT Information Provider system may be able to view and use information about current traffic conditions on one or more road segments based on contemporaneous actual vehicle travel on those road segments (as reported by mobile data sources traveling on those road segments and/or by sensors and other data sources providing information about actual vehicle travel on those road segments).

The client devices 382 may take various forms in various embodiments, and may generally include any communication devices and other computing devices capable of making requests to and/or receiving information from the traffic information systems. In some cases, the client devices may execute interactive console applications (e.g., Web browsers) that users may utilize to make requests for traffic-related information (e.g., predicted future traffic conditions information, realtime or near-realtime current traffic conditions information, etc.), while in other cases at least some such traffic-related information may be automatically sent to the client devices (e.g., as text messages, new Web pages, specialized program data updates, etc.) from one or more of the traffic information systems.

The road traffic sensors 386 include multiple sensors that are installed in, at, or near various streets, highways, or other roads, such as for one or more geographic areas. These sensors may include loop sensors that are capable of measuring the number of vehicles passing above the sensor per unit time, vehicle speed, and/or other data related to traffic flow. In addition, such sensors may include cameras, motion sensors, radar ranging devices, RFID-based devices, and other types of sensors that are located adjacent to or otherwise near a road. The road traffic sensors 386 may periodically or continuously provide measured data readings via wire-based or wireless-based data link to the Data Sample Manager system 350 via the network 380 using one or more data exchange mechanisms (e.g., push, pull, polling, request-response, peer-to-peer, etc.). In addition, while not illustrated here, in some embodiments one or more aggregators of such road traffic sensor information (e.g., a governmental transportation body that operates the sensors) may instead obtain the raw data and make that data available to the traffic information systems (whether in raw form or after it is processed).

The other data sources 388 include a variety of types of other sources of data that may be utilized by one or more of the traffic information systems to provide traffic-related information to users, customers, and/or other computing systems. Such data sources include map services and/or databases that provide information regarding road networks, such as the connectivity of various roads to one another as well as traffic control information related to such roads (e.g., the existence and location of traffic control signals and/or speed zones). Other data sources may also include sources of information about events and/or conditions that impact and/or reflect traffic conditions, such as short-term and long-term weather forecasts, school schedules and/or calendars, event schedules and/or calendars, traffic incident reports provided by human operators (e.g., first responders, law enforcement personnel, highway crews, news media, travelers, etc.), road work information, holiday schedules, etc.

The vehicle-based clients/data sources 384 in this example may each be a computing system and/or communication system located within a vehicle that provides data to one or more of the traffic information systems and/or that receives data from one or more of those systems. In some embodiments, the Data Sample Manager system 350 may utilize a distributed network of vehicle-based mobile data sources and/or other user-based mobile data sources (not shown) that provide information related to current traffic conditions for use by the traffic information systems. For example, each vehicle or other mobile data source may have a GPS ("Global Positioning System") device (e.g., a cellular telephone with GPS capabilities, a stand-alone GPS device, etc.) and/or other geo-location device capable of determining the geographic location, and possibly other information such as speed, direction, elevation and/or other data related to the vehicle's travel, with the geo-location device(s) or other distinct communication devices obtaining and providing such data to one or more of the traffic information systems (e.g., by way of a wireless link) from time to time. Such mobile data sources are discussed in greater detail elsewhere.

Alternatively, some or all of the vehicle-based clients/data sources 384 may each have a computing system and/or communication system located within a vehicle to obtain information from one or more of the traffic information systems, such as for use by an occupant of the vehicle. For example, the vehicle may contain an in-dash navigation system with an installed Web browser or other console application that a user may utilize to make requests for traffic-related information via a wireless link from one of the traffic information systems, such as the Predictive Traffic Information Provider system and/or RT Information Provider system, or instead such requests may be made from a portable device of a user in the vehicle. In addition, one or more of the traffic information systems may automatically transmit traffic-related information to such a vehicle-based client device based upon the receipt or generation of updated information.

The third-party computing systems 390 include one or more optional computing systems that are operated by parties other than the operator(s) of the traffic information systems, such as parties who receive traffic-related data from one or more of the traffic information systems and who make use of the data in some manner. For example, the third-party computing systems 390 may be systems that receive traffic information from one or more of the traffic information systems, and that provide related information (whether the received information or other information based on the received information) to users or others (e.g., via Web portals or subscription services). Alternatively, the third-party computing systems 390 may be operated by other types of parties, such as media organizations that gather and report traffic conditions to their consumers, or online map companies that provide traffic-related information to their users as part of travel-planning services.

As previously noted, the Predictive Traffic Information Provider system 360 may use data prepared by the Data Sample Manager system 350 and other components in the illustrated embodiment to generate future traffic condition predictions for multiple future times. In some embodiments, the predictions are generated using probabilistic techniques that incorporate various types of input data in order to repeatedly produce future time series predictions for each of numerous road segments, such as in a realtime manner based on changing current conditions for a network of roads in a given geographic area. Moreover, in at least some embodiments one or more predictive Bayesian or other models (e.g., decision trees) are automatically created for use in generating the future traffic condition predictions for each geographic area of interest, such as based on observed historical traffic conditions for those geographic areas. Predicted future traffic condition information may be used in a variety of ways to assist in travel and for other purposes, such as to plan optimal routes through a network of roads based on predictions about traffic conditions for the roads at multiple future times.

Furthermore, the Road Segment Determiner system 362 may utilize map services and/or databases that provide information regarding road networks in one or more geographic areas in order to automatically determine and manage information related to the roads that may be used by other traffic information systems. Such road-related information may include determinations of particular portions of roads to be treated as road segments of interest (e.g., based on traffic conditions of those road portions and other nearby road portions), as well as automatically generated associations or relationships between road segments in a given road network and indications of other information of interest (e.g., physical locations of road traffic sensors, event venues, and landmarks; information about functional road classes and other related traffic characteristics; etc.). In some embodiments, the Road Segment Determiner system 362 may execute periodically and store the information it produces in storage 340 or a database (not shown) for use by other traffic information systems.

In addition, the Key Road Identifier system 361 utilizes a road network representing a given geographic area and traffic condition information for that geographic area to automatically identify roads that are of interest for tracking and assessing road traffic conditions, such as for used by other traffic information systems and/or traffic data clients. In some embodiments, the automatic identification of a road (or of one or more road segments of the road) as being of interest may be based at least in part on factors such as the magnitude of peak traffic volume or other flow, the magnitude of peak traffic congestion, intra-day variability of traffic volume or other flow, intra-day variability of congestion for the road, inter-day variability of traffic volume or other flow, and/or inter-day variability of congestion for the road. Such factors may be analyzed by way of, for example, principal components analysis, such as by first computing a covariance matrix S of traffic condition information for all roads (or road segments) in a given geographic area, and then computing an Eigen decomposition of the covariance matrix S. In descending order of Eigenvalue, the Eigenvectors of S then represent the combinations of roads (or road segments) that independently contribute most strongly to the variance of the observed traffic conditions.

In addition, a realtime traffic information provider or presenter system may be provided by the RT Information Provider system, or instead by one or more of the other programs 369. The information provider system may utilize data analyzed and provided by the Data Sample Manager system 350 and/or other components (such as the Predictive Traffic Information Provider system 360) in order to provide traffic information services to consumers and/or business entities that are operating or otherwise utilizing client devices 382, vehicle-based clients 384, third-party computing systems 390, etc., such as to provide data in a realtime or near-realtime manner based at least in part on data samples obtained from vehicles and other mobile data sources.

It will be appreciated that the illustrated computing systems are merely illustrative and are not intended to limit the scope of the present invention. Computing system 300 may be connected to other devices that are not illustrated, including through one or more networks such as the Internet or via the Web. More generally, a "client" or "server" computing system or device, or traffic information system and/or component, may comprise any combination of hardware or software that can interact and perform the described types of functionality, including without limitation desktop or other computers, database servers, network storage devices and other network devices, PDAs, cellphones, wireless phones, pagers, electronic organizers, Internet appliances, television-based systems (e.g., using set-top boxes and/or personal/digital video recorders), and various other consumer products that include appropriate inter-communication capabilities. In addition, the functionality provided by the illustrated system components may in some embodiments be combined in fewer components or distributed in additional components. Similarly, in some embodiments the functionality of some of the illustrated components may not be provided and/or other additional functionality may be available.

In addition, while various items are illustrated as being stored in memory or on storage while being used, these items or portions of them can be transferred between memory and other storage devices for purposes of memory management and/or data integrity. Alternatively, in other embodiments some or all of the software components and/or modules may execute in memory on another device and communicate with the illustrated computing system via inter-computer communication. Some or all of the system components or data structures may also be stored (e.g., as software instructions or structured data) on a computer-readable medium, such as a hard disk, a memory, a network, or a portable media article to be read by an appropriate drive or via an appropriate connection. The system components and data structures can also be transmitted as generated data signals (e.g., as part of a carrier wave or other analog or digital propagated signal) on a variety of computer-readable transmission mediums, including wireless-based and wired/cable-based mediums, and can take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 4:
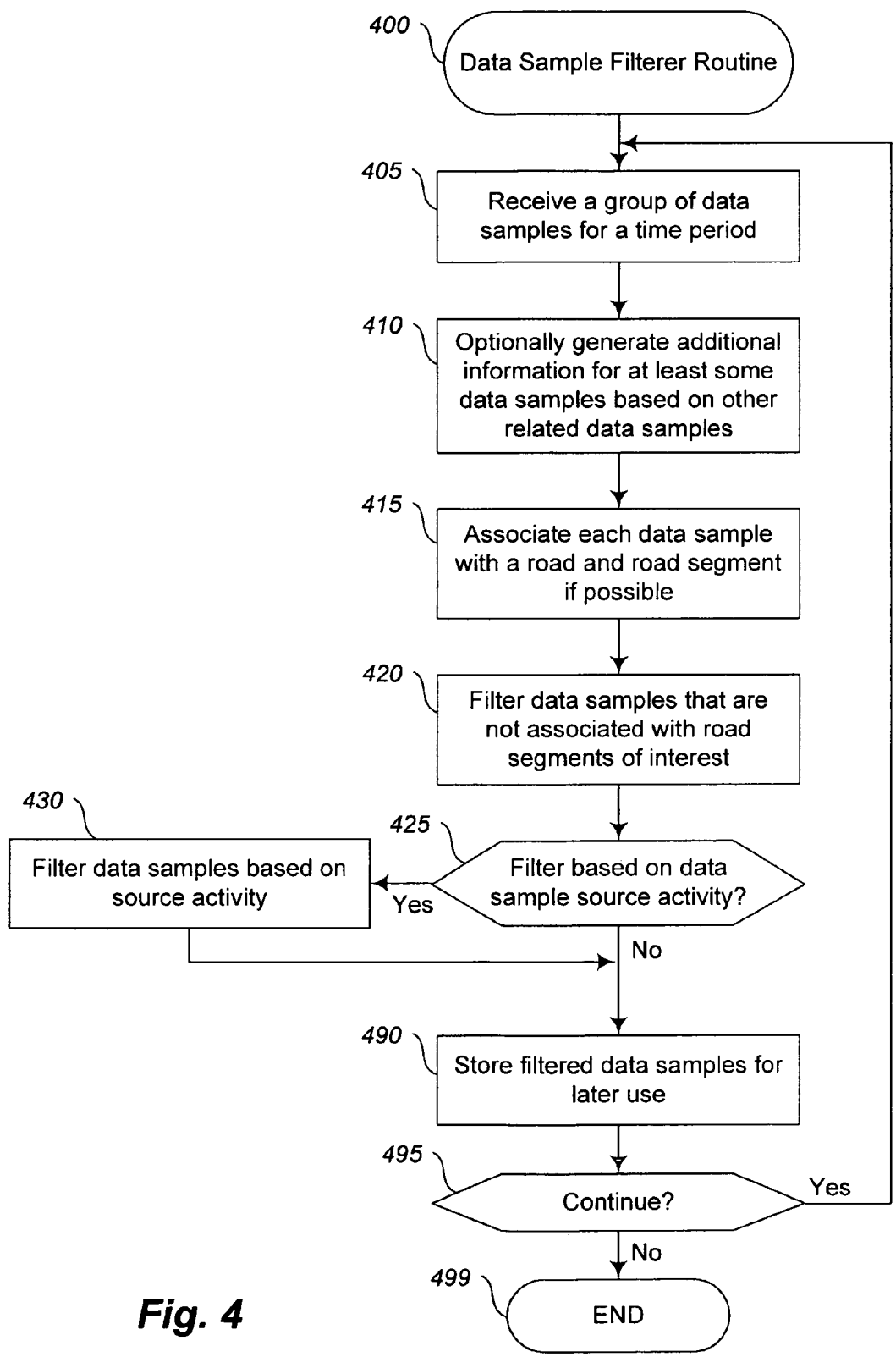
FIG. 4 is a flow diagram of an example embodiment of a Data Sample Filterer routine.

FIG. 4 is a flow diagram of an example embodiment of a Data Sample Filterer routine 400. The routine may be provided by, for example, execution of an embodiment of a Data Sample Filterer component 352 of FIG. 3 and/or Data Sample Filterer component 104 of FIG. 1, such as to receive data samples corresponding to roads in a geographic area and to filter data samples that are not of interest for later assessments. The filtered data samples may then subsequently be used in various ways, such as to use the filtered data samples to calculate average speeds for particular road segments of interest and to calculate other traffic flow-related characteristics for such road segments.

The routine begins in step 405, where a group of data samples is received for a geographic area for a particular period of time. In step 410, the routine then optionally generates additional information for some or all of the data samples based on other related data samples. For example, if a particular data sample for a vehicle or other mobile data source lacks information of interest (such as speed and/or heading or orientation for the mobile data source), such information may be determined in conjunction with one or both of the prior and subsequent data samples for the same mobile data source. In addition, in at least some embodiments information from multiple data samples for a particular mobile data source may be aggregated in order to assess additional types of information regarding the data source, such as to assess an activity of the data source over a period of time that spans multiple data samples (e.g., to determine if a vehicle has been parked for several minutes rather than temporarily stopped for a minute or two as part of the normal flow of traffic, such as at a stop sign or stop light).

After step 410, the routine continues to step 415 to attempt to associate each data sample with a road in the geographic area and a particular road segment of that road, although in other embodiments this step may not be performed or may be performed in other manners, such as if at least an initial association of a data sample to a road and/or road segment is instead received in step 405, or instead if the entire routine is performed at a single time for a single road segment such that all of the data samples received in step 405 as a group correspond to a single road segment. In the illustrated embodiment, the association of a data sample to a road and road segment may be performed in various ways, such as to make an initial association based solely on a geographic location associated with the data sample (e.g., to associate the data sample with the nearest road and road segment). Furthermore, the association may optionally include additional analysis to refine or revise that initial association—for example, if a location-based analysis indicates multiple possible road segments for a data sample (such as multiple road segments for a particular road, or instead multiple road segments for nearby but otherwise unrelated roads), such additional analysis may use other information such as speed and orientation to affect the association (e.g., by combining location information and one or more other such factors in a weighted manner). Thus, for example, if the reported location of a data sample is between a freeway and a nearby frontage road, information about the reported speed of the data sample may be used to assist in associating the data sample with the appropriate road (e.g., by determining that a data sample with an associated speed of 70 miles per hour is unlikely to originate from a frontage road with a speed limit of 25 miles per hour). In addition, in situations in which a particular stretch of road or other road portion is associated with multiple distinct road segments (e.g., for a two-lane road in which travel in one direction is modeled as a first road segment and in which travel in the other direction is modeled as a distinct second road segment, or instead a multi-lane freeway in which an HOV lane is modeled as a separate road segment from one or more adjacent non-HOV lanes), additional information about the data sample such as speed and/or orientation may be used to select the most likely road segment of the road for the data sample.

After step 415, the routine continues to step 420 to filter any data samples that are not associated with road segments that are of interest for later processing, including data samples (if any) that are not associated with any road segment. For example, certain roads or portions of roads may not be of interest for later analysis, such as to exclude roads of certain functional road classes (e.g., if the size of the road and/or its amount of traffic is not sufficiently large to be of interest), or to exclude portions of roads such as a freeway ramp or feeder road or collector/distributor road since the traffic characteristics of such road portions are not reflective of the freeway as a whole. Similarly, in situations in which multiple road segments are associated with a particular portion of road, some road segments may not be of interest for some purposes, such as to exclude an HOV lane for a freeway if only the behavior of the non-HOV lanes are of interest for a particular purpose, or if only one direction of a two-way road is of interest. After step 420, the routine continues to step 425 to determine whether to filter data samples based on activity of the data sources, although in other embodiments such filtering may not be performed or may always be performed. In the illustrated embodiment, if the filtering is to be performed based on the source activity, the routine continues to step 430 to perform such filtering, such as to remove data samples corresponding to data sources whose behavior does not reflect the traffic flow activity of interest to be measured (e.g., to exclude vehicles that are parked with their engines running for an extended period of time, to exclude vehicles that are driving around in a parking lot or parking garage or other small area for an extended period of time, etc.). After step 430, or if it was instead determined in step 425 to not filter based on data source activity, the routine continues to step 490 to store the filtered data for later use, although in other embodiments the filtered data could instead be provided directly to one or more clients. The routine then continues to step 495 to determine whether to continue. If so, the routine returns to step 405, and if not continues to step 499 and ends.

Figure 5:
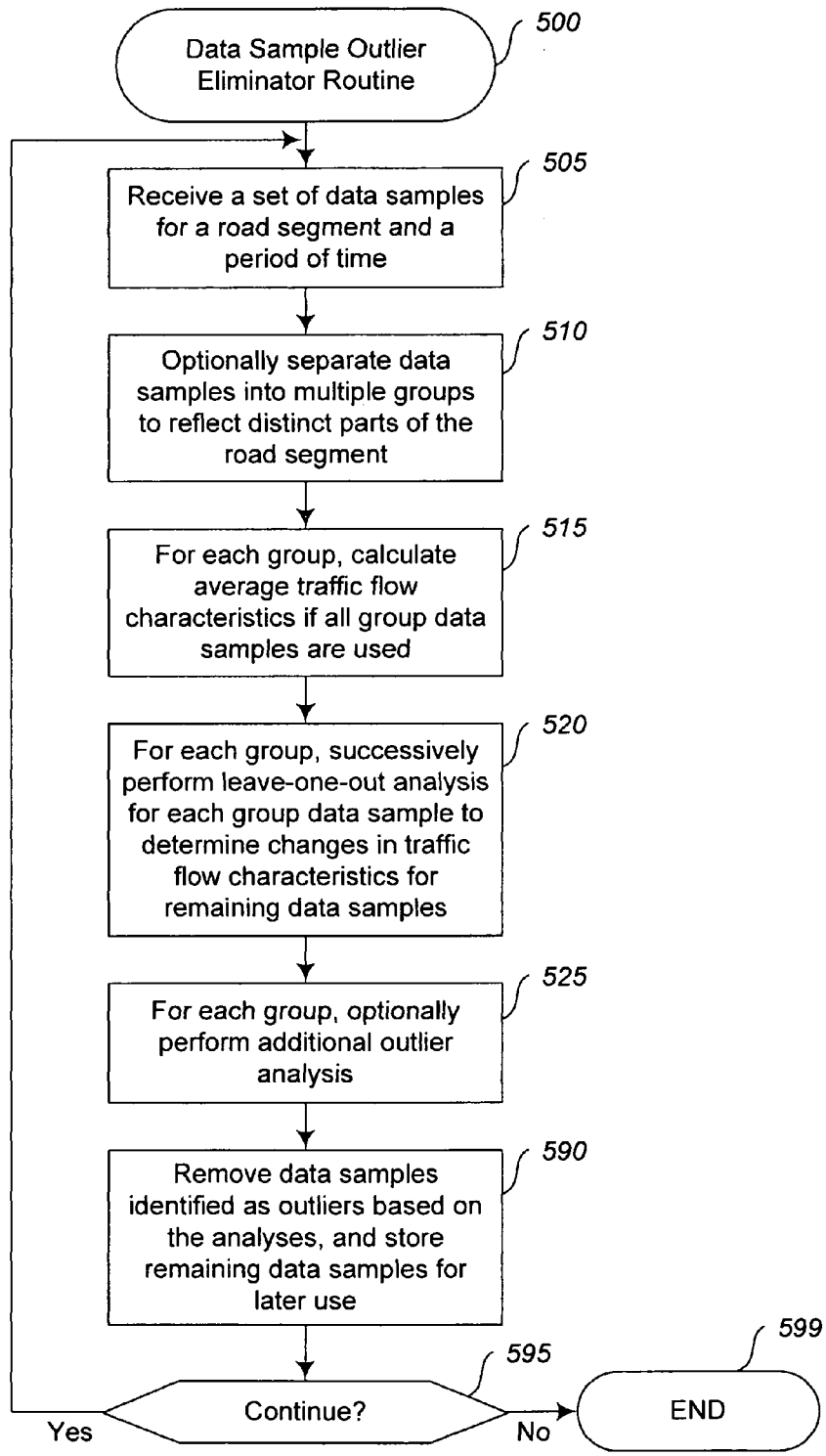
FIG. 5 is a flow diagram of an example embodiment of a Data Sample Outlier Eliminator routine.

FIG. 5 is a flow diagram of an example embodiment of a Data Sample Outlier Eliminator routine 500. The routine may be provided by, for example, execution of an embodiment of a Data Sample Outlier Eliminator component 354 of FIG. 3 and/or Data Sample Outlier Eliminator component 106 of FIG. 1, such as to eliminate data samples for a road segment that are outliers with respect to the other data samples for the road segment.

The routine begins in step 505, where a set of data samples for a road segment and a time period are received. The received data samples may be, for example, filtered data samples obtained from the output of the Data Sample Filterer routine. In step 510, the routine then optionally separates the data samples into multiple groups to reflect distinct parts of the road segment and/or distinct behaviors. For example, if multiple freeway lanes are included together as part of a single road segment and the multiple lanes include at least one HOV lane and one or more non-HOV lanes, the vehicles in the HOV lane(s) may be separated from vehicles in the other lanes if the traffic flow during the time period is significantly different between the HOV and non-HOV lanes. Such grouping may be performed in various ways, such as by fitting the data samples to multiple curves that each represent typical data sample variability within a particular group of data samples (e.g., a normal or Gaussian curve). In other embodiments, such grouping may not be performed, such as if the road segment is instead divided such that all of the data samples for the road segment reflect similar behavior (e.g., if a freeway with an HOV lane and other non-HOV lanes is instead split into multiple road segments).

The routine next continues to step 515 to, for each of the one or more groups of data samples (with all of the data samples being treated as a single group if the data sample separating of step 510 is not performed), calculate average traffic condition characteristics for all of the data samples. Such average traffic condition characteristics may include, for example, an average speed, as well as corresponding statistical information such as a standard deviation from the mean. The routine then continues to step 520 to, for each of the one or more data sample groups, successively perform a leave-one-out analysis such that a particular target data sample is selected to be provisionally left out and average traffic condition characteristics are determined for the remaining traffic condition characteristics. The larger the difference between the average traffic condition characteristics for the remaining data samples and the average traffic condition characteristics for all data samples from step 515, the greater the likelihood that the left-out target data sample is an outlier that does not reflect common characteristics of the other remaining data samples. In step 525, the routine then optionally performs one or more additional types of outlier analysis, such as to successively leave out groups of two or more target data samples in order to assess their joint effect, although in some embodiments such additional outlier analysis may not be performed. After step 522, the routine continues to step 590 to remove data samples that are identified as outliers in steps 520 and/or 525, and stores the remaining data samples for later use. In other embodiments, the routine may instead forward the remaining data samples to one or more clients for use. The routine then continues to step 595 to determine whether to continue. If so, the routine returns to step 505, and if not the routine continues to step 599 and ends.

Figure 6:
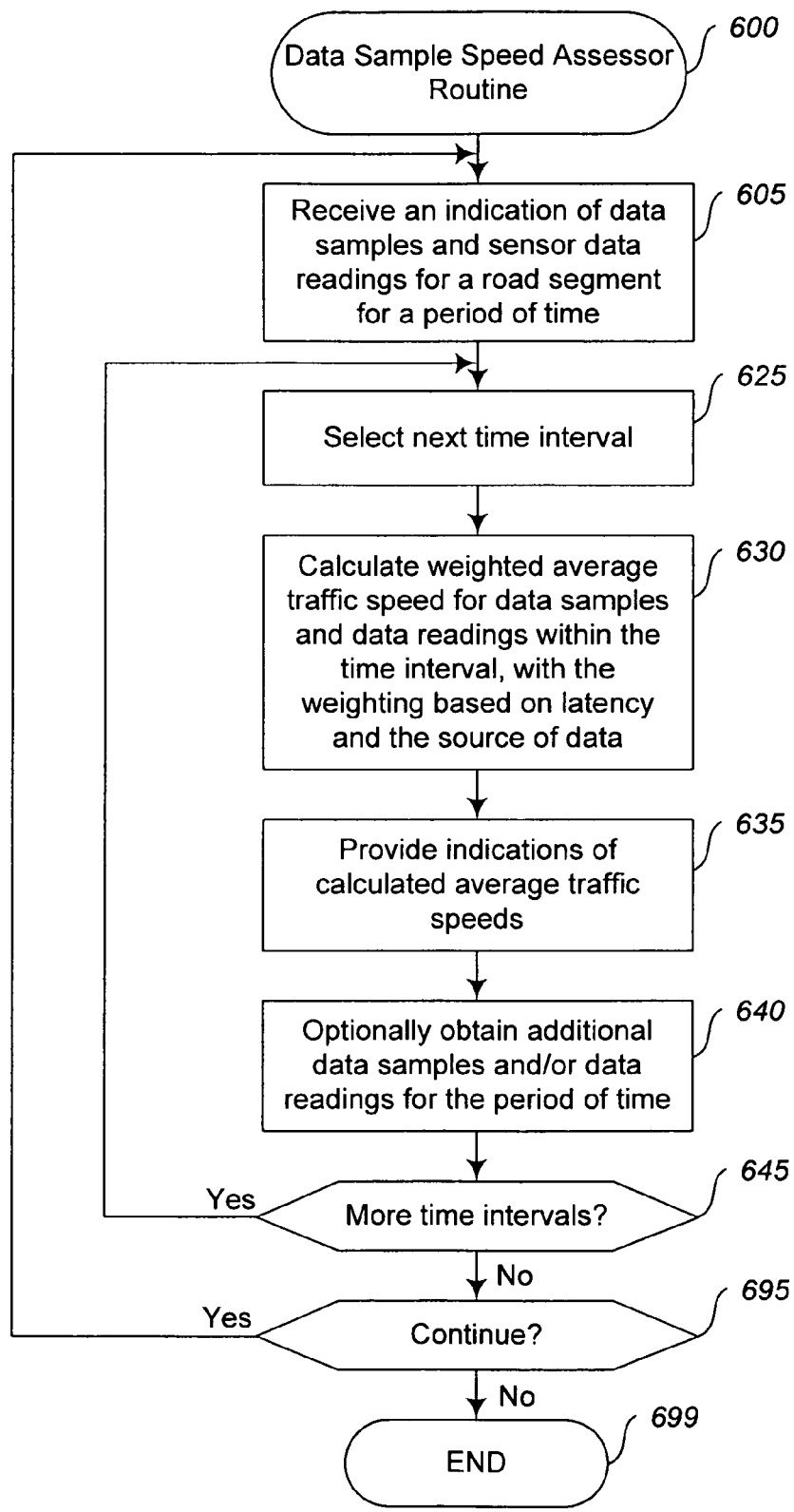
FIG. 6 is a flow diagram of an example embodiment of a Data Sample Speed Assessor routine.

FIG. 6 is a flow diagram of an example embodiment of a Data Sample Speed Assessor routine 600. The routine may be provided by, for example, execution of the Data Sample Speed Assessor component 356 of FIG. 3 and/or the Data Sample Speed Assessor component 107 of FIG. 1, such as to assess a current average speed for a road segment during a period of time based on various data samples for the road segment. In this example embodiment, the routine will perform successive calculations of average speed for the road segment for each of multiple time intervals or windows during the period of time, although in other embodiments each invocation of the routine may instead be for a single time interval (e.g., with multiple time intervals assessed via multiple invocations of the routine). For example, if the time period is thirty minutes, a new average speed calculation may be performed every five minutes, such as with 5-minute time intervals (and thus with each time interval not overlapping with prior or successive time intervals), or with 10-minute time intervals (and thus overlapping with adjacent time intervals).

The routine begins at step 605, where an indication is received of data samples (e.g., data samples from mobile data sources and physical sensor data readings) for a road segment for a period of time, although in some embodiments only one of data samples from mobile data sources and from sensor data readings may be received. The received data samples may be, for example, obtained from the output of the Data Sample Outlier Eliminator routine. In this example, the routine continues in step 625 to select the next time interval or window for which an average speed is to be assessed, beginning with the first time interval. In step 630, the routine then calculates a weighted average traffic speed for the data samples within the time interval, with the weighting of the data samples being based on one or more factors. For example, in the illustrated embodiment, the weighting for each data sample is varied (e.g., in a linear, exponential, or step-wise manner) based on the latency of the data sample, such as to give greater weight to data samples near the end of the time interval (as they may be more reflective of the actual average speed at the end of the time interval). In addition, the data samples may further be weighted in the illustrated embodiment based on the source of the data, such as to weight data readings from physical sensors differently from data samples from vehicles and other mobile data sources, whether more or less heavily. In addition, in other embodiments, various other factors could be used in the weighting, including on a per-sample basis—for example, a data reading from one physical sensor may be weighted differently than a data reading from another physical sensor, such as to reflect available information about the sensors (e.g., that one of the physical sensors is intermittently faulty or has a less accurate data reading resolution than another sensor), and a data sample from one vehicle or other mobile data source may similarly be weighted differently from that of another such vehicle or mobile data source based on information about the mobile data sources. Other types of factors that in some embodiments may be used in the weightings include confidence values or other estimates of the possible error in a particular data sample, a degree of confidence that a particular data sample should be associated with a particular road segment, etc.

After step 630, the routine continues to step 635 to provide an indication of the average calculated traffic speed for the time interval, such as to store the information for later use and/or to provide the information to a client. In step 640, the routine then optionally obtains additional data samples for the time period that have become available subsequent to the receipt of information in step 605. It is then determined in step 645 whether more time intervals are to be calculated for the time period, and if so the routine returns to step 625. If there are instead no more time intervals, the routine continues to step 695 to determine whether to continue. If so, the routine returns to step 605, and if not continues to step 699 and ends.

Figure 7:
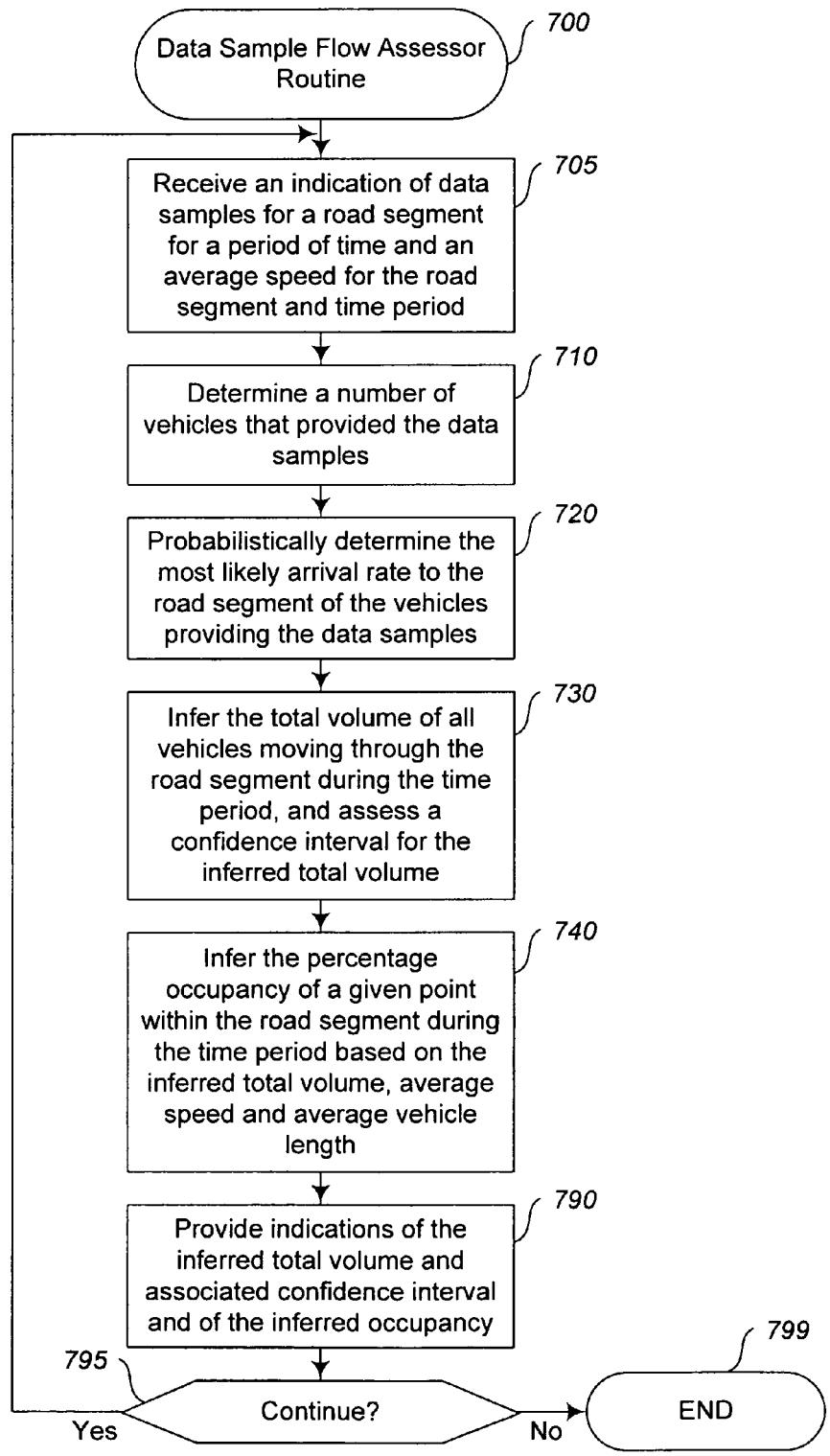
FIG. 7 is a flow diagram of an example embodiment of Data Sample Flow Assessor routine.

FIG. 7 is a flow diagram of an example embodiment of a Data Sample Flow Assessor routine 700. The routine may be provided by, for example, execution of an embodiment of a Data Sample Flow Assessor component 358 of FIG. 3 and/or Data Sample Flow Assessor component 108 of FIG. 1, such as to assess traffic condition flow characteristics other than average speed for a particular road segment during a particular period of time. In this example embodiment, the flow characteristics to be assessed include a total volume of vehicles (or other mobile data sources) arriving at or present on a particular road segment during a period of time, and a percentage occupancy for the road segment during the period of time to reflect the percentage of time that a point on or area of the road segment is covered by a vehicle.

The routine begins at step 705, where an indication is received of data samples for a road segment for a period of time, as well as an average speed for the road segment during the period of time. The data samples may be obtained from, for example, output of the Data Sample Outlier Eliminator routine, and the average speed may be obtained from, for example, output of the Data Sample Speed Assessor routine. The routine then continues in step 710 to determine a number of vehicles (or other mobile data sources) that provided the data samples, such as by associating each data sample with a particular mobile data source. In step 720, the routine then probabilistically determines the most likely arrival rate to the road segment of the vehicles providing the data samples, based in part on the determined number of vehicles. In some embodiments, the probabilistic determination may further use information about the a priori probability of the number of such vehicles and the a priori probability of a particular arrival rate. In step 730, the routine then infers the total volume of all vehicles passing through the road segment during the period of time, such as based on the determined number of vehicles and information about what percentage of the total number of vehicles are vehicles that provide data samples, and further assesses a confidence interval for the inferred total volume. In step 740, the routine then infers the percentage occupancy for the road segment during the period of time based on the inferred total volume, the average speed, and an average vehicle length. Other types of traffic flow characteristics of interest may similarly be assessed in other embodiments. In the illustrated embodiment, the routine then continues to step 790 to provide indications of the inferred total volume and the inferred percentage occupancy. If it is then determined in step 795 to continue, the routine returns to step 705, and if not continues to step 799 and ends.

FIGS. 9A-9C illustrate examples of actions of mobile data sources in obtaining and providing information about road traffic conditions. Information about road traffic conditions may be obtained from mobile devices (whether vehicle-based devices and/or user devices) in various ways, such as by being transmitted using a wireless link (e.g., satellite uplink, cellular network, WI-FI, packet radio, etc.) and/or physically downloaded when the device reaches an appropriate docking or other connection point (e.g., to download information from a fleet vehicle once it has returned to its primary base of operations or other destination with appropriate equipment to perform the information download). While information about road traffic conditions at a first time that is obtained at a significantly later second time provides various benefits (e.g., verifying predictions about the first time, for use as observed case data in later improving a prediction process, etc.), such as may be the case for information that is physically downloaded from a device, such road traffic condition information provides additional benefits when obtained in a realtime or near-realtime manner. Accordingly, in at least some embodiments mobile devices with wireless communication capabilities may provide at least some acquired information about road traffic conditions on a frequent basis, such as periodically (e.g., every 30 seconds, 1 minute, 5 minutes, etc.) and/or when a sufficient amount of acquired information is available (e.g., for every acquisition of a data point related to road traffic condition information; for every N acquisitions of such data, such as where N is a configurable number; when the acquired data reaches a certain storage and/or transmission size; etc.). In some embodiments, such frequent wireless communications of acquired road traffic condition information may further be supplemented by additional acquired road traffic condition information at other times (e.g., upon a subsequent physical download from a device, via less-frequent wireless communications that contain a larger amount of data, etc.), such as to include additional data corresponding to each data point, to include aggregated information about multiple data points, etc.

While various benefits are provided by obtaining acquired road traffic condition information from mobile devices in a realtime or other frequent manner, in some embodiments such wireless communications of acquired road traffic condition information may be restricted in various ways. For example, in some cases the cost structure of transmitting data from a mobile device via a particular wireless link (e.g., satellite uplink) may be such that transmissions occur at less-frequent intervals (e.g., every 15 minutes), or the mobile devices may have been pre-programmed to transmit at such intervals. In other cases, a mobile device may temporarily lose an ability to transmit data over a wireless link, such as due to a lack of wireless coverage in an area of the mobile device (e.g., due to no nearby cellphone receiver station), due to other activities being performed by the mobile device or a user of the device, or due to a temporary problem with the mobile device or an associated transmitter.

Accordingly, in some embodiments at least some such mobile devices may be designed or otherwise configured to store multiple data samples (or to cause such multiple data samples to be stored on another associated device) so that at least some information for the multiple data samples may be transmitted together during a single wireless transmission. For example, in some embodiments at least some mobile devices are configured to store acquired road traffic condition information data samples during periods when the mobile device is unable to transmit data over a wireless link (e.g., such as for a mobile device that typically transmits each data sample individually, such as every 30 seconds or 1 minute), and to then transmit those stored data samples together (or a subset and/or aggregation of those samples) during the next wireless transmission that occurs. Some mobile devices may also be configured to perform wireless transmissions periodically (e.g., every 15 minutes, or when a specified amount of data is available to be transmitted), and in at least some embodiments may further be configured to acquire and store multiple data samples of road traffic condition information (e.g., at a pre-determined sampling rate, such as 30 seconds or a minute) over the time interval between wireless transmissions and to then similarly transmit those stored data samples together (or a subset and/or aggregation of those samples) during the next wireless transmission. As one example, if a wireless transmission of up to 1000 units of information costs $0.25 and each data sample is 50 units in size, it may be advantageous to sample every minute and send a data set comprising 20 samples every 20 minutes (rather than sending each sample individually each minute). In such embodiments, while data samples may be delayed slightly (in the example of the periodic transmissions, by on average half of the time period between transmissions, assuming regular acquisitions of the data samples), the road traffic condition information obtained from the transmissions still provides near-realtime information. Moreover, in some embodiments additional information may be generated and provided by a mobile device based on multiple stored data samples. For example, if a particular mobile device is able to acquire only information about a current instant position during each data sample, but is not able to acquire additional related information such as speed and/or direction, such additional related information may be calculated or otherwise determined based on multiple subsequent data samples.

In particular, FIG. 9A depicts an example area 955 with several interconnected roads 925, 930, 935 and 940, and a legend indication 950 indicates the direction of North for the roads (with roads 925 and 935 running in a north-south direction, and with roads 930 and 940 running in an east-west direction). While only a limited number of roads are indicated, they may represent a large geographic area, such as interconnected freeways over numerous miles, or a subset of city streets spanning numerous blocks. In this example, a mobile data source (e.g., a vehicle, not shown) has traveled from location 945a to 945c over a period of 30 minutes, and is configured to acquire and transmit a data sample indicating current traffic conditions each 15 minutes. Accordingly, as the mobile data source begins to travel, it acquires and transmits a first data sample at location 945a (as indicated in this example by an asterisk "*"), acquires and transmits a second data sample 15 minutes later at location 945b, and acquires and transmits a third data sample a total of 30 minutes later at location 945c. In this example, each data sample includes an indication of current position (e.g., in GPS coordinates), current direction (e.g., northbound), current speed (e.g., 30 miles per hour), and current time, as represented for the 945a transmission using data values $P_a$, $D_a$, $S_a$ and $T_a$, and may optionally include other information as well (e.g., an identifier to indicate the mobile data source). While such acquired and provided current traffic conditions information provides some benefit, numerous details cannot be determined from such data, including whether the route from location 945b to 945c occurred in part along road 930 or along 940. Moreover, such sample data does not allow, for example, portions of road 925 between locations 945a and 945b to be treated as distinct road segments for which distinct traffic conditions can be reported and predicted.

In a manner similar to FIG. 9A, FIG. 9B depicts an example 905 with a mobile data source traveling over the interconnected roads 925, 930, 935 and 940 from location 945a to 945c over a period of 30 minutes, and with the mobile data source transmitting information about traffic conditions each 15 minutes (as indicated by the asterisks shown at locations 945a, 945b and 945c). However, in this example the mobile data source is configured to acquire and store data samples every minute, with a subsequent transmission including data from each of the data samples during the prior 15 minutes.

Accordingly, as the mobile data source travels between location 945a and 945b, the mobile data source acquires a set 910b of 15 data samples 910b1-910b15, with each data sample indicated in this example with an arrow pointed in the direction of the mobile data source at the time of the data sample. In this example, each data sample similarly includes an indication of current position, current direction, current speed, and current time, and the subsequent transmission at location 945b includes those data values for each of the data samples 910b. Similarly, as the mobile data source travels between location 945b and 945c, the mobile data source acquires 15 data samples 910c1-910c15, and the subsequent transmission at location 945c includes the acquired data values for each of those 15 data samples. By providing such additional data samples, various additional information may be obtained. For example, it is now easily determined that the route from location 945b to 945c occurred in part along road 930 rather than road 940, allowing corresponding traffic condition information to be attributed to road 930. In addition, particular data samples and their adjacent data samples may provide various information about smaller sections of roads, such as to allow road 925 between locations 945a and 945b to be represented as, for example, up to 15 distinct road segments (e.g., by associating each data sample with a distinct road segment) that each has potentially distinct road traffic conditions. For example, it can be visually observed that the average speed for data samples 910b1-910b6 is approximately static (since the data samples are approximately equally spaced), that the average speed increased for data samples 910b7 and 910b8 (since the data samples correspond to locations that are farther apart, reflecting that greater distance was traveled during the given 1-minute interval between data samples for this example), and that the average speed decreased for data samples 910b11-910b15. While the data samples in this example provide information about such speed directly, in other embodiments such speed information may be derived from data sample information that includes only current position.

FIG. 9C depicts a third example 990 with a mobile data source traveling over a portion of the interconnected roads from location 965a to 965c over a period of 30 minutes, and with the mobile data source transmitting information about traffic conditions each 15 minutes (as indicated by the asterisks shown at locations 965a, 965b and 965c). As in FIG. 9C, the mobile data source is configured in this example to acquire and store data samples every minute, with a subsequent transmission including data from each of at least some of the data samples during the prior 15 minutes. Accordingly, as the mobile data source travels between location 965a and 965b, the mobile data source acquires a set 960b of 15 data samples 960b1-960b15. However, as is illustrated by co-located data samples 960b5-b13 (with circles used in this instance rather than arrows because no movement was detected for these data samples, but shown separately rather than on top of each other for the purposes of clarity), in this example the mobile data source has stopped for approximately 9 minutes at a location to the side of road 925 (e.g., to stop at a coffee shop). Accordingly, when the next transmission at location 965b occurs, the transmission may in some embodiments include all of the information for all of the data samples, or may instead omit at least some such information (e.g., to omit information for data samples 960b6-960b12, since in this situation they do not provide additional useful information if it is known that the mobile data source remained immobile between data samples 960b5 and 960b13). Moreover, while not illustrated here, in other embodiments in which the information for one or more such data samples is omitted, the subsequent transmission may be delayed until 15 data samples to be transmitted are available (e.g., if the periodic transmissions are performed based on amount of data to send rather than time). Moreover, as the mobile data source travels between location 965b and 965c, the mobile data source acquires data samples 960c13 and 960c14 in an area in which wireless communications are not currently available (as indicated in this example with open circles rather than arrows). In other embodiments in which each data sample is individually transmitted when acquired but is not otherwise saved, these data samples would be lost, but in this example are instead stored and transmitted along with the other data samples 960c1-960c12 and 960c15 at location 965c. While not shown here, in some situations a mobile data source may further temporarily lose the ability to obtain one or more data samples using a primary means of data acquisition (e.g., if a mobile data source loses the ability to obtain GPS readings for a few minutes)—if so, the mobile data source may in some embodiments report the other obtained data samples without further action (e.g., such as to allow the recipient to interpolate or otherwise estimate those data samples if so desired), while in other embodiments may attempt to obtain data samples in other manners (e.g., by using a less accurate mechanism to determine location, such as cellphone tower triangulation, or by estimating current location based on a prior known location and subsequent average speed and heading, such as via dead reckoning), even if those data samples have less precision or accuracy (e.g., which may be reflected by including a lesser degree of confidence or higher degree of possible error to those data samples, or by otherwise including an indication of how those and/or other data samples were generated).

While the example data samples in each of FIGS. 9B and 9C are illustrated for a single vehicle or other mobile data source for the purposes of clarity, in other embodiments the multiple data samples for a particular mobile data source may not be used to determine a particular route taken by that mobile data source, and more generally may not even be associated with each other (e.g., if the source of each mobile data sample is anonymous or otherwise undifferentiated from other sources). For example, if multiple data samples from a particular mobile data source are not used by a recipient to generate aggregate data related to those data samples (e.g., to generate speed and/or direction information based on successive data samples that provide only location information), such as when such aggregate data is included with each data sample or is not used, such a recipient may not be provided in some embodiments with identifying data related to the source of the mobile data samples and/or with indications that the multiple data samples are from the same mobile data source (e.g., based on a design decision to increase privacy related to the mobile data sources).

Instead, in at least some such embodiments, multiple mobile data sources are used together to determine road condition information of interest, such as to use multiple data samples from all mobile data sources for a particular road segment (or other portion of a road) to determine aggregate information for that road segment. Thus, for example, during a period of time of interest (e.g., 1 minute, 5 minutes, 15 minutes, etc.), numerous unrelated mobile data sources may each provide one or more data samples related to their own travel on a particular road segment during that time period, and if each such data sample includes speed and direction information (for example), an average aggregate speed may be determined for that time period and that road segment for all mobile data sources that are generally moving in the same direction, such as in a manner similar to a road sensor that aggregates information for multiple vehicles passing the sensor. A particular data sample may be associated with a particular road segment in various ways, such as by associating the data sample location with the road (or road segment) having the nearest location (whether for any road, or only for roads meeting specified criteria, such as being of one or more indicated functional road classes) and then selecting the appropriate road segment for that road, or by using an indication provided by a mobile data source along with a data sample of an associated road (or road segment). In addition, in at least some embodiments roads other than 1-way roads will be treated as distinct roads for the purposes of assigning data samples to roads and for other purposes (e.g., to treat the northbound lanes of a freeway as being a distinct road from the southbound lanes of the freeway), and if so the direction for a mobile data sample may further be used to determine the appropriate road with which the data sample is associated—in other embodiments, however, roads may be modeled in other manners, such as to treat a two-way city street as a single road (e.g., with average traffic conditions being reported and predicted for vehicles moving in both directions), to treat each lane of a multiple lane freeway or other road as a distinct logical road, etc.

In some embodiments, to facilitate the use of multiple mobile data sources to determine road condition information of interest, fleet vehicles may be configured in various ways to provide data samples of use. For example, if a large fleet of vehicles will each leave the same origination point at a similar time each day, various of the fleet vehicles may be configured differently regarding how soon and how often to begin providing data samples, such as to minimize a very large number of data points all near the single origination point and/or to provide variability in when data samples will be acquired and transmitted. More generally, a mobile data source device may be configured in various ways regarding how and when to acquire data samples, including based on total distance covered since a starting point (e.g., an origination point for a group of fleet vehicles), distance covered since a last data sample acquisition and/or transmission, total time elapsed since a starting time (e.g., a departure time of a fleet vehicle from an origination point), time elapsed since a last data sample acquisition and/or transmission, an indicated relationship having occurred with respect to one or more indicated locations (e.g., passing by, arriving at, departing from, etc.), etc. Similarly, a mobile data source device may be configured in various ways regarding how and when to transmit or otherwise provide one or more acquired data samples, including based on total distance covered since a starting point, distance covered since a last data sample acquisition and/or transmission, total time elapsed since a starting time, time elapsed since a last data sample acquisition and/or transmission, an indicated relationship having occurred with respect to one or more indicated locations, an indicated number of data samples having been gathered, an indicated amount of data having been gathered (e.g., an amount such as to fill or substantially fill a cache used to store the data samples on the mobile device, or an amount such as to fill or substantially fill an indicated amount of time for a transmission), etc.

Figure 8:
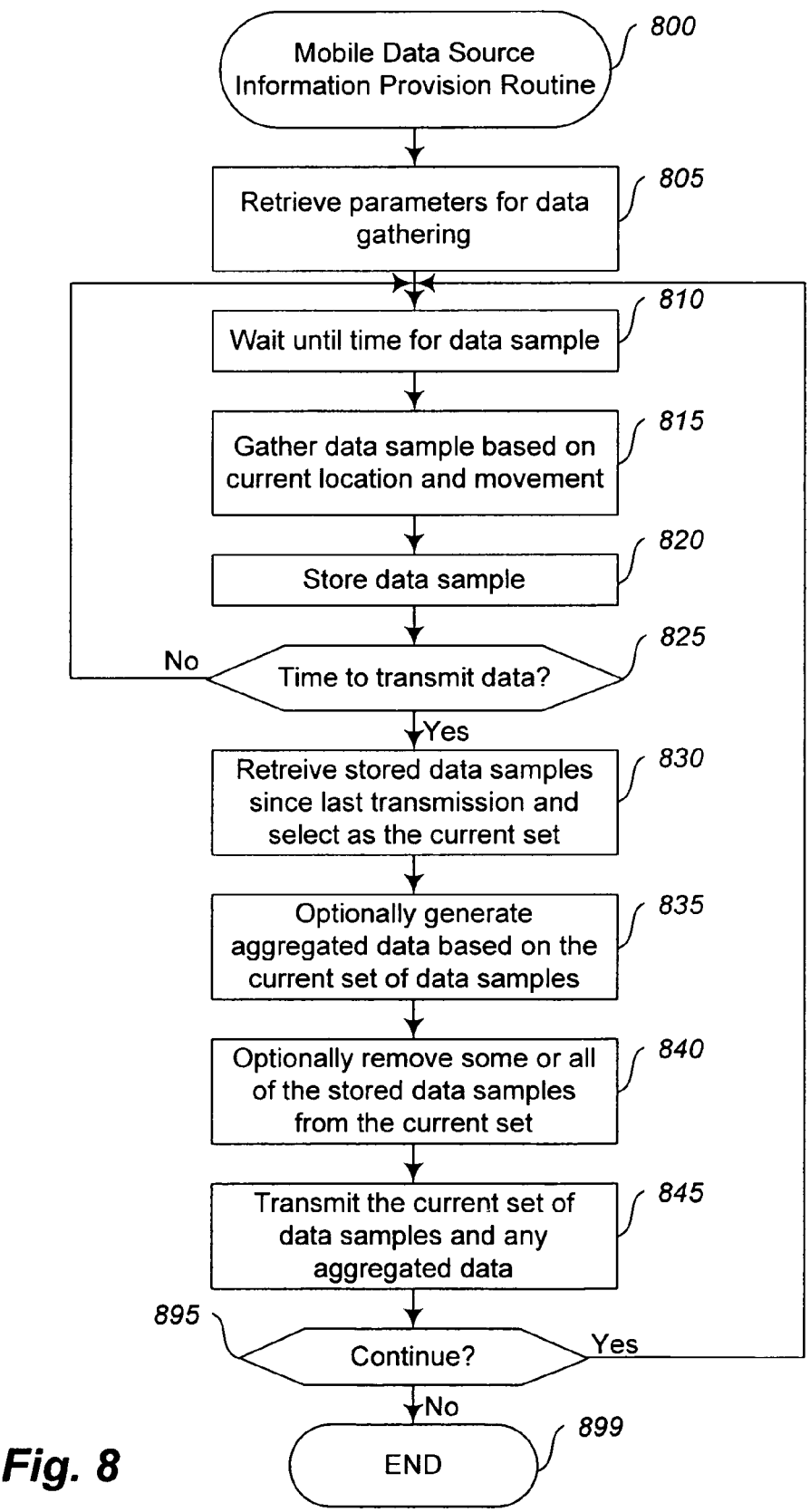
FIG. 8 is a flow diagram of an example embodiment of a Mobile Data Source Information Provision routine.

FIG. 8 is a flow diagram of an example embodiment of a Mobile Data Source Information Provision routine 800, such as may be provided by, for example, operation of a mobile data source device for each of one or more of the vehicle-based data sources 384 of FIG. 3 and/or other data sources 388 (e.g., user devices) of FIG. 3 and/or vehicle-based data sources 101 of FIG. 1 and/or other data sources 102 of FIG. 1. In this example, the routine acquires data samples for a particular mobile data source to indicate current traffic conditions, and stores the data samples as appropriate such that a subsequent transmission may include information for multiple data samples.

The routine begins at step 805, where parameters are retrieved that will be used as part of the data sample acquisition and providing, such as configurable parameters to indicate when data samples should be acquired and when transmissions should occur with information corresponding to one or more data samples. The routine continues to step 810 to wait until it is time to acquire a data sample, such as based on the retrieved parameters and/or other information (e.g., an indicated amount of time having passed since a prior data sample acquisition, an indicated distance having been traveled since a prior data sample acquisition, an indication to acquire data samples in a substantially continuous manner, etc.). The routine then continues to step 815 to acquire a data sample based on the current location and movement of the mobile data source, and stores the data sample in step 820. If it is determined in step 825 that it is not yet time to transmit data, such as based on the retrieved parameters and/or other information (e.g., an indicated amount of time having passed since a prior transmission, an indicated distance having been traveled since a prior transmission, an indication to transmit data samples as soon as they become available or in a substantially continuous manner, etc.), the routine returns to step 810.

Otherwise, the routine continues to step 830 to retrieve and select any stored data samples since the prior transmission (or since startup, for the first transmission). The routine then optionally in step 835 generates aggregated data based on multiple of the selected data samples (e.g., an overall average speed for all of the data samples, an average speed and a direction for each data sample if the acquired information provides only location information, etc.), although in other embodiments such aggregated data generation may not be performed. In step 840, the routine then optionally removes some or all of the acquired information for some or all of the data samples from the selected set of data samples (e.g., to transmit only selected types of data for each data sample, to remove data samples that appear to be outliers or otherwise erroneous, to remove data samples that do not correspond to actual movement of the mobile data source, etc.), although in other embodiments such information removal may not be performed. In step 845, the routine then transmits the current information in the current set of data samples and any aggregated information to a recipient that will use the data in an appropriate manner. In step 895, the routine determines whether to continue (e.g., whether the mobile data source continues to be in use and mobile), and if so returns to step 810. Otherwise, the routine continues to step 899 and ends. In embodiments and situations in which a mobile data source is not able to transmit data, whether due to temporary conditions or instead to reflect configuration of or limitations of the mobile data source, the steps 830-845 may not be performed until such time as the mobile data source is able to transmit or otherwise provide (e.g., via physical download) some or all of the data samples that have been acquired and stored since a prior transmission.

As previously noted, once information about road traffic conditions has been obtained, such as from one or more mobile data sources and/or one or more other sources, the road traffic conditions information may be used in various ways, such as to report current road traffic conditions in a substantially realtime manner, or to use past and current road traffic condition information to predict future traffic conditions at each of multiple future times. In some embodiments, the types of input data used to generate predictions of future traffic conditions may include a variety of current, past, and expected future conditions, and outputs from the prediction process may include the generated predictions of the expected traffic conditions on each of multiple target road segments of interest for each of multiple future times (e.g., every 5, 15 or 60 minutes in the future) within a pre-determined time interval (e.g., three hours, or one day), as discussed in greater detail elsewhere. For example, types of input data may include the following: information about current and past amounts of traffic for various target road segments of interest in a geographic area, such as for a network of selected roads in the geographic area; information about current and recent traffic accidents; information about current, recent and future road work; information about current, past and expected future weather conditions (e.g., precipitation, temperature, wind direction, wind speed, etc.); information about at least some current, past and future scheduled events (e.g., type of event, expected start and end times of the event, and/or a venue or other location of the event, etc., such as for all events, events of indicated types, events that are sufficiently large, such as to have expected attendance above an indicated threshold (for example, 1000 or 5000 expected attendees), etc.); and information about school schedules (e.g., whether school is in session and/or the location of one or more schools). In addition, while in some embodiments the multiple future times at which future traffic conditions are predicted are each points in time, in other embodiments such predictions may instead represent multiple time points (e.g., a period of time), such as by representing an average or other aggregate measure of the future traffic conditions during those multiple time points. Furthermore, some or all of the input data may be known and represented with varying degrees of certainty (e.g., expected weather), and additional information may be generated to represent degrees of confidence in and/or other metadata for the generated predictions. In addition, the prediction of future traffic conditions may be initiated for various reasons and at various times, such as in a periodic manner (e.g., every five minutes), when any or sufficient new input data is received, in response to a request from a user, etc.

Some of the same types of input data may be used to similarly generate longer-term forecasts of future traffic conditions (e.g., one week in the future, or one month in the future) in some embodiments, but such longer-term forecasts may not use some of the types of input data, such as information about current conditions at the time of the forecast generation (e.g., current traffic, weather, or other conditions). In addition, such longer-term forecasts may be generated less frequently than shorter-term predictions, and may be made so as to reflect different future time periods than for shorter-term predictions (e.g., for every hour rather than every 15 minutes).

The roads and/or road segments for which future traffic condition predictions and/or forecasts are generated may also be selected in various manners in various embodiments. In some embodiments, future traffic condition predictions and/or forecasts are generated for each of multiple geographic areas (e.g., metropolitan areas), with each geographic area having a network of multiple inter-connected roads—such geographic areas may be selected in various ways, such as based on areas in which current traffic condition information is readily available (e.g., based on networks of road sensors for at least some of the roads in the area) and/or in which traffic congestion is a significant problem. In some such embodiments, the roads for which future traffic condition predictions and/or forecasts are generated include those roads for which current traffic condition information is readily available, while in other embodiments the selection of such roads may be based at least in part on one or more other factors (e.g., based on size or capacity of the roads, such as to include freeways and major highways; based on the role the roads play in carrying traffic, such as to include arterial roads and collector roads that are primary alternatives to larger capacity roads such as freeways and major highways; based on functional class of the roads, such as is designated by the Federal Highway Administration; etc.). In other embodiments, future traffic condition predictions and/or forecasts may be made for a single road, regardless of its size and/or inter-relationship with other roads. In addition, segments of roads for which future traffic condition predictions and/or forecasts are generated may be selected in various manners, such as to treat each road sensor as a distinct segment; to group multiple road sensors together for each road segment (e.g., to reduce the number of independent predictions and/or forecasts that are made, such as by grouping specified numbers of road sensors together); to select road segments so as to reflect logically related sections of a road in which traffic conditions are typically the same or sufficiently similar (e.g., strongly correlated), such as based on traffic condition information from traffic sensors and/or from other sources (e.g., data generated from vehicles and/or users that are traveling on the roads, as discussed in greater detail elsewhere); etc.

In addition, future traffic condition prediction and/or forecast information may be used in a variety of ways in various embodiments, as discussed in greater detail elsewhere, including to provide such information to users and/or organizations at various times (e.g., in response to requests, by periodically sending the information, etc.) and in various ways (e.g., by transmitting the information to cellular telephones and/or other portable consumer devices; by displaying information to users, such as via Web browsers and/or application programs; by providing the information to other organizations and/or entities that provide at least some of the information to users, such as third parties that perform the information providing after analyzing and/or modifying the information; etc.). For example, in some embodiments, the prediction and/or forecast information is used to determine suggested travel routes and/or times, such as an optimal route between a starting location and an ending location over a network of roads and/or an optimal time to perform indicated travel, with such determinations based on predicted and/or forecast information at each of multiple future times for one or more roads and/or road segments.

In addition, various embodiments provide various mechanisms for users and other clients to interact with one or more of the traffic information systems (e.g., the Data Sample Manager system 350, RT Information Provider system 363, and/or Predictive Traffic Information Provider system 360 of FIG. 3, etc.). For example, some embodiments may provide an interactive console (e.g. a client program providing an interactive user interface, a Web browser-based interface, etc.) from which clients can make requests and receive corresponding responses, such as requests for information related to current and/or predicted traffic conditions and/or requests to analyze, select, and/or provide information related to travel routes. In addition, some embodiments provide an API ("Application Programmer Interface") that allows client computing systems to programmatically make some or all such requests, such as via network message protocols (e.g., Web services) and/or other communication mechanisms.

Those skilled in the art will also appreciate that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are discussed in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method for assessing data samples reported by vehicles traveling on roads, the data samples including information regarding the travel of the vehicles, the method comprising:

receiving indications of multiple road segments of one or more roads;

receiving information related to current traffic conditions of the multiple road segments, the received information including a plurality of data samples that each are reported from one of multiple vehicles and reflect a reported speed of the one vehicle at a reported geographic location and reflect a reported travel heading of the one vehicle; and for each of the multiple road segments, assessing traffic conditions for the road segment based on data samples identified to represent travel on the road segment by, identifying a group of multiple data samples from the plurality of data samples such that the data samples of the group have reported geographic locations that are within a predefined distance of one or more predefined geographic locations for the road segment and have reported travel headings that are within a predefined difference from one or more predefined headings for the road segment;

automatically determining that one or more of the data samples of the group are unrepresentative of actual vehicle travel on the road segment based at least in part on the reported geographic locations of the determined data samples not corresponding to predefined portions of the road segment for which vehicle travel is of interest and based at least in part on the reported speeds of one or more vehicles that reported the determined data samples not corresponding to a range of speeds associated with the road segment, wherein the predetermined portions of one or more of the multiple road segments that are each part of a highway do not include any ramps on or off the highway and wherein the determined one or more data samples for each of the one or more road segments include at least one data sample having a reported geographic location that is determined to correspond to one the ramps, the automatic determining being performed by one or more configured computing systems;

automatically excluding from the group the data samples determined to be unrepresentative of actual vehicle travel on the road segment, the automatic excluding being performed by the one or more configured computing systems; and after the excluding, automatically using the data samples remaining in the group to infer traffic conditions for all vehicles traveling on the road segment, so that inferred traffic conditions based on data samples are available for use in facilitating travel on the road segments.

2. The method of claim 1 wherein one of the multiple road segments corresponds to a first section of a highway having multiple lanes, wherein the predefined geographic locations for the one road segment include a geographic area that covers the multiple lanes of the highway for the first section, wherein the predefined distance by which the geographic area is extended is based at least in part on a degree of accuracy of a type of location determination device that is used to determine the reported geographic locations for at least some of the data samples of the identified group for the one road segment, wherein the predefined headings for the one road segment include one or more headings that correspond to a direction of vehicle travel on the multiple lanes of the highway for the first section, and wherein the predefined difference for the one or more predefined headings for the one road segment is based at least in part on a degree of accuracy of a type of heading determination device that is used to determine the reported travel headings for at least some of the data samples of the identified group for the one road segment.

3. The method of claim 2 wherein the predefined portions of the one road segment for which vehicle travel is of interest include one or more lanes of the highway, and wherein one of the data samples of the identified group for the one road segment that is determined to be unrepresentative of actual vehicle travel on the one road segment is a data sample whose reported geographic location is determined to correspond to a collector/distributor road or lane near the highway.

4. The method of claim 2 wherein the predefined portions of the one road segment for which vehicle travel is of interest include a subset of the lanes of the highway, and wherein one of the data samples of the identified group for the one road segment that is determined to be unrepresentative of actual vehicle travel on the one road segment is a data sample whose reported geographic location is determined to correspond to a lane of the highway that is not in the subset of lanes.

5. The method of claim 2 wherein one of the data samples of the identified group for the one road segment that is determined to be unrepresentative of actual vehicle travel on the one road segment is a data sample that is from a vehicle traveling on another road segment corresponding to a distinct second section of the highway and that is determined to be incorrectly associated with the one road segment.

6. The method of claim 2 wherein the type of location determination device is a type of Global Positioning System (GPS) device, and wherein the predefined distance by which the geographic area is extended corresponds to a distance within which a reading from a GPS device of the type is accurate.

7. The method of claim 1 wherein each of the plurality of data samples further indicate a reported time associated with the reported speed and reported geographic location and reported travel heading for the data sample, wherein the assessing of the traffic conditions for each of the multiple road segments is performed for each of multiple distinct periods of time, and wherein the identifying of the group of data samples for a road segment for a period of time is further performed such that the identified data samples of the group have reported times that correspond to the period of time.

8. The method of claim 1 wherein data samples related to current traffic conditions of the multiple road segments are repeatedly received to reflect changing traffic conditions, wherein the assessing of the traffic conditions for each of the multiple road segments is performed for recently received data samples in a realtime manner, and wherein the using of data samples remaining in a group to infer traffic conditions for all vehicles traveling on a road segment includes providing information about the inferred traffic conditions to one or more people considering upcoming travel on the road segment.

9. A non-transitory computer-readable medium whose stored contents configure a computing device to assess data samples reported by vehicles traveling on roads, the data samples including information regarding the travel of the vehicles, the assessing of the data samples including performing a method comprising:
   receiving indications of multiple road segments of one or more roads;
   receiving information related to current traffic conditions of the multiple road segments, the received information including a plurality of data samples that each are reported from one of multiple vehicles and reflect a reported speed of the one vehicle at a reported geographic location and reflect a reported travel heading of the one vehicle; and
   for each of the multiple road segments, assessing traffic conditions for the road segment based on data samples identified to represent travel on the road segment by,
      identifying a group of multiple data samples from the plurality of data samples such that the data samples of the group have reported geographic locations that are within a predefined distance of one or more predefined geographic locations for the road segment and have reported travel headings that are within a predefined difference from one or more predefined headings for the road segment;
      automatically determining that one or more of the data samples of the group are unrepresentative of actual vehicle travel on the road segment based at least in part on the reported geographic locations of the determined data samples not corresponding to predefined portions of the road segment for which vehicle travel is of interest and based at least in part on the report speeds of one or more vehicles that reported the determined data samples not corresponding to one or more expected speeds associated with the road segment, wherein the predefined portions of one or more of the multiple road segments that are each part of a highway do not include any ramps on or off the highway, the automatic determining being performed by the configured computing device;
      automatically excluding from the group the data samples determined to be unrepresentative of actual vehicle travel on the road segment, the automatic excluding being performed by the configured computing device; and
      after the excluding, automatically using the data samples remaining in the group to infer traffic conditions for all vehicles traveling on the road segment to facilitate travel on the road segments.

10. The non-transitory computer-readable medium of claim 9 wherein one of the multiple road segments corresponds to a first section of a highway having multiple lanes, wherein the predefined geographic locations for the one road segment include a geographic area that covers the multiple lanes of the highway for the first section, wherein the predefined distance by which the geographic area is extended is based at least in part on a degree of accuracy of a type of location determination device that is used to determine the reported geographic locations for at least some of the data samples of the identified group for the one road segment, wherein the predefined headings for the one road segment include one or more headings that correspond to a direction of vehicle travel on the multiple lanes of the highway for the first section, and wherein the predefined difference for the one or more predefined headings for the one road segment is based at least in part on a degree of accuracy of a type of heading determination device that is used to determine the reported travel headings for at least some of the data samples of the identified group for the one road segment.

11. The non-transitory computer-readable medium of claim 10 wherein the predefined portions of the one road segment for which vehicle travel is of interest include one or more lanes of the highway, and wherein one of the data samples of the identified group for the one road segment that is determined to be unrepresentative of actual vehicle travel on the one road segment is a data sample whose reported geographic location is determined to correspond to a ramp on and/or off the highway.

12. The non-transitory computer-readable medium of claim 10 wherein the predefined portions of the one road segment for which vehicle travel is of interest include one or more lanes of the highway, and wherein one of the data samples of the identified group for the one road segment that is determined to be unrepresentative of actual vehicle travel on the one road segment is a data sample whose reported geographic location is determined to correspond to a collector/distributor road or lane near the highway.

13. The non-transitory computer-readable medium of claim 10 wherein the predefined portions of the one road segment for which vehicle travel is of interest include a subset of the lanes of the highway, and wherein one of the data samples of the identified group for the one road segment that is determined to be unrepresentative of actual vehicle travel on the one road segment is a data sample whose reported geographic location is determined to correspond to a lane of the highway that is not in the subset of lanes.

14. The non-transitory computer-readable medium of claim 10 wherein one of the data samples of the identified group for the one road segment that is determined to be unrepresentative of actual vehicle travel on the one road segment is a data sample that is from a vehicle traveling on another road segment corresponding to a distinct second section of the highway and that is determined to be incorrectly associated with the one road segment.

15. The non-transitory computer-readable medium of claim 10 wherein the type of location determination device is a type of Global Positioning System (GPS) device, and wherein the predefined distance by which the geographic area is extended corresponds to a distance within which a reading from a GPS device of the type is accurate.

16. The non-transitory computer-readable medium of claim 9 wherein, for each of one or more of the multiple road segments, the automatic determining that the one or more data samples of the group are unrepresentative of actual vehicle travel on the road segment is further based at least in part on one or more travel characteristics of the vehicles that reported those data samples other than reported geographic location and other than reported vehicle speed.

17. The non-transitory computer-readable medium of claim 9 wherein each of the plurality of data samples further indicate a reported time associated with the reported speed and reported geographic location and reported travel heading for the data sample, wherein the assessing of the traffic conditions for each of the multiple road segments is performed for each of multiple distinct periods of time, and wherein the identifying of the group of data samples for a road segment for a period of time is further performed such that the identified data samples of the group have reported times that correspond to the period of time.

18. The non-transitory computer-readable medium of claim 9 wherein data samples related to current traffic conditions of the multiple road segments are repeatedly received to reflect changing traffic conditions, wherein the assessing of the traffic conditions for each of the multiple road segments is performed for recently received data samples in a realtime manner, and wherein the using of data samples remaining in a group to infer traffic conditions for all vehicles traveling on a road segment includes providing information about the inferred traffic conditions to one or more people considering upcoming travel on the road segment.

19. The non-transitory computer-readable medium of claim 9 wherein the computer-readable medium is a memory of the configured computing device, and wherein the contents are instructions that when executed program the computing device to perform the method.

20. A computing system configured to assess data samples reported by vehicles traveling on roads, the data samples including information regarding the travel of the vehicles, the computing system comprising:
one or more processors; and
one or more components that are configured to, when executed by the one or more processors,
receive indications of multiple road segments of one or more roads;
receive information related to current traffic conditions of the multiple road segments, the received information including a plurality of data samples that each are reported from one of multiple vehicles and reflect a reported speed of the one vehicle at a reported geographic location and reflect a reported travel heading of the one vehicle; and
for each of the multiple road segments, assess traffic conditions for the road segment based on data samples identified to represent travel on the road segment by,
identifying a group of multiple data samples from the plurality of data samples such that the data samples of the group have reported geographic locations that are within a predefined distance of one or more predefined geographic locations for the road segment and have reported travel headings that are within a predefined difference from one or more predefined headings for the road segment;
automatically determining that one or more of the data samples of the group are unrepresentative of actual vehicle travel on the road segment based at least in part on the reported geographic locations of the determined data samples not corresponding to predefined portions of the road segment for which vehicle travel is of interest and based at least in part on the reported speeds of one or more vehicles that reported the determined data samples not corresponding to one or more expected speeds associated with the road segment; and wherein the predefined portions of one or more of the multiple road segments that are each part of a highway do not include any ramps on or off the highway;
automatically excluding from the group the data samples determined to be unrepresentative of actual vehicle travel on the road segment; and
after the excluding, automatically using the data samples remaining in the group to infer traffic conditions for all vehicles traveling on the road segment to facilitate travel on the road segments.

21. The computing system of claim 20 wherein one of the multiple road segments corresponds to a first section of a highway having multiple lanes, wherein the predefined geographic locations for the one road segment include a geographic area that covers the multiple lanes of the highway for the first section, wherein the predefined distance by which the geographic area is extended is based at least in part on a degree of accuracy of a type of location determination device that is used to determine the reported geographic locations for at least some of the data samples of the identified group for the one road segment, wherein the predefined headings for the one road segment include one or more headings that correspond to a direction of vehicle travel on the multiple lanes of the highway for the first section, and wherein the predefined difference for the one or more predefined headings for the one road segment is based at least in part on a degree of accuracy of a type of heading determination device that is used to determine the reported travel headings for at least some of the data samples of the identified group for the one road segment.

22. The computing system of claim 21 wherein the predefined portions of the one road segment for which vehicle travel is of interest include one or more lanes of the highway, and wherein one of the data samples of the identified group for the one road segment that is determined to be unrepresentative of actual vehicle travel on the one road segment is a data sample whose reported geographic location is determined to correspond to a ramp on and/or off the highway.

23. The computing system of claim 21 wherein the predefined portions of the one road segment for which vehicle travel is of interest include one or more lanes of the highway, and wherein one of the data samples of the identified group for the one road segment that is determined to be unrepresentative of actual vehicle travel on the one road segment is a data sample whose reported geographic location is determined to correspond to a collector/distributor road or lane near the highway.

24. The computing system of claim 21 wherein the predefined portions of the one road segment for which vehicle travel is of interest include a subset of the lanes of the highway, and wherein one of the data samples of the identified group for the one road segment that is determined to be unrepresentative of actual vehicle travel on the one road segment is a data sample whose reported geographic location is determined to correspond to a lane of the highway that is not in the subset of lanes.

25. The computing system of claim 21 wherein one of the data samples of the identified group for the one road segment that is determined to be unrepresentative of actual vehicle travel on the one road segment is a data sample that is from a vehicle traveling on another road segment corresponding to a distinct second section of the highway and that is determined to be incorrectly associated with the one road segment.

26. The computing system of claim 21 wherein the type of location determination device is a type of Global Positioning System (GPS) device, and wherein the predefined distance by which the geographic area is extended corresponds to a distance within which a reading from a GPS device of the type is accurate.

27. The computing system of claim 20 wherein, for each of one or more of the multiple road segments, the automatic determining that the one or more data samples of the group are unrepresentative of actual vehicle travel on the road segment is further based at least in part on one or more travel characteristics of the vehicles that reported those data samples other than reported geographic location and other than reported vehicle speed.

28. The computing system of claim 20 wherein each of the plurality of data samples further indicate a reported time associated with the reported speed and reported geographic location and reported travel heading for the data sample, wherein the assessing of the traffic conditions for each of the multiple road segments is performed for each of multiple distinct periods of time, and wherein the identifying of the group of data samples for a road segment for a period of time is further performed such that the identified data samples of the group have reported times that correspond to the period of time.

29. The computing system of claim 20 wherein data samples related to current traffic conditions of the multiple road segments are repeatedly received to reflect changing traffic conditions, wherein the assessing of the traffic conditions for each of the multiple road segments is performed for recently received data samples in a realtime manner, and wherein the using of data samples remaining in a group to infer traffic conditions for all vehicles traveling on a road segment includes providing information about the inferred traffic conditions to one or more people considering upcoming travel on the road segment.

30. The computing system of claim 20 wherein the one or more components include software instructions for execution by the one or more processors of the computing system.

* * * * *